United States Patent
Channah et al.

(10) Patent No.: US 10,846,809 B2
(45) Date of Patent: Nov. 24, 2020

(54) AUTOMATED BORDER INSPECTION

(71) Applicant: Accenture Global Services Limited, Dublin (IE)

(72) Inventors: Sheheryar Channah, Brussels (BE); Daniel Bachenheimer, Silver Spring, MD (US); Ajay Srinivasan, Bromley (GB)

(73) Assignee: Accenture Global Services Limited, Dublin (IE)

( * ) Notice: Subject to any disclaimer, the term of this patent is extended or adjusted under 35 U.S.C. 154(b) by 1027 days.

(21) Appl. No.: 14/939,771

(22) Filed: Nov. 12, 2015

(65) Prior Publication Data

US 2017/0103487 A1    Apr. 13, 2017

(30) Foreign Application Priority Data

Oct. 7, 2015 (BE) .................................. 2015/5365

(51) Int. Cl.
*G06Q 50/26* (2012.01)
*G06F 16/583* (2019.01)
(Continued)

(52) U.S. Cl.
CPC ....... *G06Q 50/265* (2013.01); *G06F 16/5854* (2019.01); *G06F 21/32* (2013.01); *G06Q 10/00* (2013.01); *G08G 1/0175* (2013.01)

(58) Field of Classification Search
CPC .............................. G06Q 10/00; G06F 3/0488
(Continued)

(56) References Cited

U.S. PATENT DOCUMENTS

| 7,272,721 B1 * | 9/2007 | Hellenthal | G07C 9/257 |
| | | | 713/182 |
| 7,312,702 B1 * | 12/2007 | Willms | G06Q 10/08 |
| | | | 340/540 |

(Continued)

FOREIGN PATENT DOCUMENTS

| WO | WO 2004/042673 | 5/2004 | |
| WO | WO-2010034317 A1 * | 4/2010 | ............. G07C 11/00 |

(Continued)

OTHER PUBLICATIONS

Lindstrom, using automatic identification on system technology to improve maritime border security (Year: 2014).*

(Continued)

*Primary Examiner* — Sangeeta Bahl
(74) *Attorney, Agent, or Firm* — Fish & Richardson P.C.

(57) ABSTRACT

Methods, systems, and apparatus, including computer programs encoded on computer storage media, for controlling access to physical areas. One of the methods includes receiving first data, determining, using the first data, whether each of the passengers for a vehicle is authorized to cross a border, storing second data in a data set of pre-registered border crossers, receiving third data identifying the vehicle and indicating entry of the vehicle into a border crossing station, comparing the third data with data from the data set of pre-registered border crossers, determining that the third data and the second data both identify the vehicle, collecting, for each current passenger in the vehicle, fourth data representing the current passenger, determining whether the current passengers in the vehicle and the passengers identified in the second data are the same people, and providing instructions to guide the vehicle to a lane at the border crossing station.

20 Claims, 6 Drawing Sheets

(51) Int. Cl.
*G06Q 10/00* (2012.01)
*G08G 1/017* (2006.01)
*G06F 21/32* (2013.01)

(58) Field of Classification Search
USPC .......................................................... 705/1.1
See application file for complete search history.

(56) References Cited

U.S. PATENT DOCUMENTS

| | | | | |
|---|---|---|---|---|
| 7,336,203 | B2 * | 2/2008 | Arquette | G08G 1/01 340/907 |
| 7,366,203 | B2 * | 4/2008 | Deas | H04L 12/2801 348/E7.094 |
| 7,676,392 | B2 | 3/2010 | Hedley et al. | |
| 8,160,892 | B2 | 4/2012 | Casey et al. | |
| 8,332,095 | B2 | 12/2012 | Hembury | |
| 8,710,955 | B2 * | 4/2014 | Teti | G07C 9/37 340/5.7 |
| 2004/0165750 | A1 | 8/2004 | Chew | |
| 2004/0167861 | A1 | 8/2004 | Hedley | |
| 2005/0055582 | A1 | 3/2005 | Bazakos et al. | |
| 2007/0273471 | A1 * | 11/2007 | Shilling | G06Q 10/00 340/5.2 |
| 2008/0015772 | A1 | 1/2008 | Sanma et al. | |
| 2008/0040029 | A1 * | 2/2008 | Breed | G01S 19/50 701/514 |
| 2008/0136625 | A1 * | 6/2008 | Chew | G01V 5/0008 340/540 |
| 2008/0147246 | A1 * | 6/2008 | Cochran | G07C 9/00087 701/1 |
| 2008/0175438 | A1 | 7/2008 | Alves | |
| 2008/0224823 | A1 * | 9/2008 | Lawson | G06F 21/34 340/5.8 |
| 2010/0021015 | A1 * | 1/2010 | Bissett | G07C 9/257 382/115 |
| 2012/0007749 | A1 * | 1/2012 | Oldknow | G08G 1/017 340/933 |
| 2013/0027187 | A1 | 1/2013 | Yepel | |
| 2014/0032098 | A1 * | 1/2014 | Anderson | B60N 2/002 701/428 |
| 2015/0054639 | A1 | 2/2015 | Rosen | |
| 2015/0163390 | A1 | 6/2015 | Lee et al. | |
| 2015/0206403 | A1 * | 7/2015 | Weinstein | G08B 13/2497 340/531 |
| 2015/0248595 | A1 | 9/2015 | Khan et al. | |
| 2015/0341320 | A1 | 11/2015 | Casey et al. | |
| 2016/0024730 | A1 * | 1/2016 | Richmond | E01F 13/06 404/6 |
| 2016/0203651 | A1 * | 7/2016 | Heath | H04W 4/40 705/13 |
| 2016/0300414 | A1 * | 10/2016 | Lambert | G06F 17/30876 |

FOREIGN PATENT DOCUMENTS

| | | |
|---|---|---|
| WO | WO 2010/058058 | 5/2010 |
| WO | WO 2014/080388 | 5/2014 |
| WO | WO 2015/071325 | 5/2015 |

OTHER PUBLICATIONS

Rio, Automated border control e-gates and facial recognition systems, (2016) (Year: 2016).*
European Office Action for Application No. 16192746.2, dated Oct. 9, 2017, 6 pages.
Belgium Search Report for Application No. 201605043, dated Sep. 22, 2016, 19 pages (with English Summary).
'GoSwift' [online]. "Drivers data," [retrieved on Sep. 4, 2015]. Retrieved from the Internet: https://www.evpa.fi/yphis/preReserveCrossersData.action?timeslot=04.09.2015%2012;00, 1 page.
'Swift' [online]. "Borders," [retrieved on Sep. 4, 2015]. Retrieved from the Internet: http://www.goswift.eu/services/boarders/, 3 pages.
'Vehicle Occupancy Detection Corporation,' [online]. "Vehicle Occupancy Detection—Video Demonstration," [retrieved on Sep. 4, 2015]. Retrieved from the Internet: http://www.vehicleoccupancydetection.com/, 3 pages.
'Wikipedia' [online]. "Biometric passport," Last modified on Sep. 2, 2015 [retrieved on Sep. 8, 2015]. Retrieved from the Internet: http://en.wikipedia.org/wiki/Biometric_passport, 25 pages.
'Wikipedia' [online]. "ePassport gates," last modified on Aug. 24, 2015 [retrieved on Sep. 4, 2015]. Retrieved from the Internet: https://en.wikipedia.org/wiki/EPassport_gates, 2 pages.
'Wikipedia' [online]. "NEXUS (frequent traveler program)," last modified Aug. 25, 2015 [retrieved on Sep. 4, 2015]. Retrieved from the Internet: https://en.wikipedia.org/wiki/Nexus_%28frequent_traveler_program%29, 7 pages.
European Extended Search Report for Application No. 16192746.2, dated Feb. 22, 2017, 5 pages.
Belgium Search Report and Written Opinion in Application No. 201505635, dated Apr. 14, 2016, 15 pages (with English translation).

* cited by examiner

```
400
```

```
┌─────────────────────────────────────────────┐
│ Receive, for each of three or more vehicles, first data │
│ identifying the vehicle and indicating entry of the vehicle │
│ into a border crossing station that provides access to the │
│ particular border                        402 │
└─────────────────────────────────────────────┘
                        ↓
┌─────────────────────────────────────────────┐
│ Compare the first data identifying the vehicle with data from │
│ the data set of pre-registered border crossers to determine │
│ whether a set of data in the data set of pre-registered │
│ border crossers is for the same vehicle   404 │
└─────────────────────────────────────────────┘
                        ↓
┌─────────────────────────────────────────────┐
│ Is: a) at least one passenger for the vehicle not authorized │
│ to cross the particular border or is not allowed participation │
│ in an automated crossing process, or │
│ b) the vehicle not authorized to cross the particular border │
│ or not allowed participation in an automated crossing │
│ process, or │
│ c) does the data set of pre-registered border crossers not │
│ include any data for the vehicle?         406 │
└─────────────────────────────────────────────┘
         Yes                    No
          ↓                      ↓
┌──────────────────────────┐  ┌──────────────────────────┐
│ Provide instructions to guide the │  │ Collect, for at least some of the current │
│ vehicle to a particular lane at the │  │ passengers in the vehicle, data │
│ border crossing station at which a │  │ representing the current passenger │
│ guard manually inspects the vehicle │  │                        412 │
│ and current passengers in the vehicle │  └──────────────────────────┘
│                        408 │
└──────────────────────────┘
          ↓
┌──────────────────────────┐
│ Provide instructions for presentation of │
│ a user interface identifying the vehicle │
│                        410 │
└──────────────────────────┘
```

FIG. 4 ature that described in this specification can be embodied in methods
AUTOMATED BORDER INSPECTION

CROSS-REFERENCE TO RELATED APPLICATION

The present application claims the benefit of Belgium Patent Application No. 2015/5365, filed on Oct. 7, 2015, which is incorporated herein by reference in its entirety for all purposes.

BACKGROUND

To cross a border, a vehicle and its occupants may be subject to a manual check by a border control officer to determine who is in a vehicle, what the vehicle is transporting, or both. The border control officer may determine whether the people in the vehicle have permission to cross the border.

SUMMARY

In general, one innovative aspect of the subject matter described in this specification can be embodied in methods that include the actions of receiving first data identifying a vehicle and one or more passengers for the vehicle that are requesting to cross a particular border, determining, using the first data identifying the passengers, whether each of the passengers for the vehicle is authorized to cross the particular border in response to receiving the first data, in response to determining whether each of the passengers for the vehicle is authorized to cross the particular border, storing second data in a data set of pre-registered border crossers that identifies the vehicle, each of the passengers, and whether each of the passengers is authorized to cross the particular border, receiving, from one or more first sensors, third data identifying the vehicle and indicating entry of the vehicle into a border crossing station that provides access to the particular border, in response to receiving the third data, comparing the third data identifying the vehicle with data from the data set of pre-registered border crossers, determining that the third data and the second data both identify the vehicle in response to comparing the third data identifying the vehicle with data from the data set of pre-registered border crossers, in response to determining that the third data and the second data both identify the vehicle, collecting, from one or more second sensors and for each of one or more current passengers in the vehicle, fourth data representing the current passenger, determining whether the current passengers in the vehicle and the passengers identified in the second data are the same people by comparing the fourth data to the second data in the data set of pre-registered border crossers, and providing instructions to guide the vehicle to a lane at the border crossing station in response to determining whether the current passengers in the vehicle and the passengers identified in the second data are the same people and using the second data that identifies whether each of the passengers is authorized to cross the particular border. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, for each of three or more vehicles, first data identifying the vehicle, one or more passengers for the vehicle that are requesting to cross a particular border, determining, for each of the three or more vehicles and using the first data identifying the passengers, whether each of the passengers for the vehicle is authorized to cross the particular border in response to receiving the first data, in response to determining whether each of the passengers for the vehicle is authorized to cross the particular border, storing, for each of the three or more vehicles, a set of second data in a data set of pre-registered border crossers that identifies the vehicle, each of the passengers, and whether each of the passengers is authorized to cross the particular border, receiving, for each of the three or more vehicles and from one or more first sensors, third data identifying the vehicle and indicating entry of the vehicle into a border crossing station that provides access to the particular border, in response to receiving the third data, comparing the third data identifying the vehicle with data from the data set of pre-registered border crossers to determine whether a set of data in the data set of pre-registered border crossers is for the same vehicle, for at least one first vehicle from the three or more vehicles: determining that the third data and a first set of data in the data set of pre-registered border crossers both identify the first vehicle in response to comparing the third data identifying the first vehicle with data from the data set of pre-registered border crossers, in response to determining that the third data and the first set of data in the data set of pre-registered border crossers both identify the vehicle, collecting, from one or more second sensors and for each current passengers in the first vehicle, fourth data representing the current passenger, determining that the current passengers in the first vehicle and the passengers identified in the first set of data are the same people by comparing the fourth data to the first set of data in the data set of pre-registered border crossers, providing instructions to guide the first vehicle to a first lane at the border crossing station in response to determining that the current passengers in the first vehicle and the passengers identified in the first set of data are the same people and using the first set of data that identifies whether each of the passengers is authorized to cross the particular border, detecting the first vehicle in the first lane, and automatically opening a gate for the first lane to allow movement of the first vehicle through the gate without requiring manual inspection of the first vehicle or the current passengers in the first vehicle in response to detecting the first vehicle in the first lane, for at least one second vehicle from the three or more vehicles: determining that the third data and a second set of data in the data set of pre-registered border crossers both identify the second vehicle in response to comparing the third data identifying the second vehicle with data from the data set of pre-registered border crossers, in response to determining that the third data and the second set of data in the data set of pre-registered border crossers both identify the vehicle, collecting, by the second sensors and for each passenger in a subset of current passengers in the second vehicle, fifth data representing the current passenger, determining that the subset of the current passengers in the second vehicle and a first subset of the passengers identified in the second set of data are the same people by comparing the fifth data to the second set of data in the data set of pre-registered border crossers, and providing instructions to guide the second vehicle to a second lane at the border crossing station in response to determining that the subset of the current passengers in the second vehicle and the first subset of the passengers identified in the first data are the same people and using the second set of data that identifies whether each of the passengers is authorized to cross the particular border, determining a second subset of the passengers identified in the second set of data for the second vehicle, the second subset of the passengers disjoint from the first subset of the passengers, and providing instructions for presentation of a user interface identifying each passenger in the second subset of the passengers and the second vehicle and indicating that an identity of each of the passengers in the second subset of the passengers should be verified, and for at least one third vehicle from the three or more vehicles: providing instructions to guide the third vehicle to a third lane at the border crossing station at which a guard manually inspects the third vehicle and current passengers in the third vehicle in response to detecting the entry of the third vehicle into the border crossing station that provides access to the particular border and determining that a) some of the passengers for the third vehicle might not be authorized to cross the particular border, b) some of the passengers for the third vehicle are not allowed automated crossing over the particular border, c) the third vehicle is not allowed automated crossing over the particular border, or d) the data set of pre-registered border crossers does not include any data for the third vehicle, and providing instructions for presentation of a user interface identifying the third vehicle using the third data. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Receiving the first data identifying the vehicle and the passengers for the vehicle that are requesting to cross the particular border may include receiving the first data from a device at a location physically remote from the border crossing station. Determining, using the first data identifying the passengers, whether each of the passengers for the vehicle is authorized to cross the particular border in response to receiving the first data may include determining, using the first data identifying the passengers, whether each of the passengers for the vehicle is authorized to cross the particular border while the vehicle moves from the location to the border crossing station. Determining, using the first data identifying the passengers, whether each of the passengers for the vehicle is authorized to cross the particular border in response to receiving the first data may include determining, using the first data identifying the passengers, whether each of the passengers for the vehicle is authorized to cross the particular border before the vehicle arrives at the border crossing station.

In some implementations, receiving the first data identifying the vehicle and the passengers for the vehicle that are requesting to cross the particular border may include receiving a vehicle license plate number, and one or more of: biometric data for at least some of the passengers, passport data for at least some of the passengers, or visa data for at least some of the passengers. Receiving the first data identifying the vehicle and the passengers for the vehicle that are requesting to cross the particular border may include receiving a name for the particular border. Receiving, from one or more first sensors, the third data indicating the entry of the vehicle into the border crossing station that provides access to the particular border may include receiving, from a camera at the border crossing station, data representing an image of a particular vehicle, and determining, using the data representing the image of the vehicle, an identifier for the particular vehicle. Comparing the third data identifying the vehicle with data from the data set of pre-registered border crossers may include comparing the identifier for the particular vehicle with the second data identifying the vehicle to determine whether the particular vehicle and the vehicle are the same vehicle. Determining that the third data and the second data both identify the vehicle may include determining that the vehicle has entered the border crossing station in response to determining that the particular vehicle and the vehicle are the same vehicle. Determining the identifier for the particular vehicle may include determining a license plate number for the particular vehicle.

In some implementations, receiving, from one or more second sensors and for each of the current passengers in the vehicle, the fourth data representing the current passenger may include receiving, from one or more cameras and for each of the current passengers, image data representing a face of the passenger. Receiving, from one or more cameras and for each of the current passengers, the image data representing the face of the passenger may include receiving, for at least one of the current passengers, infrared image data. Receiving, from one or more cameras and for each of the current passengers, the image data representing the face of the passenger may include receiving, for at least one of the current passengers, visible light image data. Receiving, from one or more second sensors and for each of the current passengers in the vehicle, the fourth data representing the current passenger may include in response to determining that the third data and the second data both identify the vehicle, sending a message to the second sensors requesting capture of the fourth data for each of the current passengers, and in response to sending a message to the second sensors requesting capture of the fourth data for each of the current passengers, receiving, from the second sensors and for each of the current passengers in the vehicle, the fourth data representing the current passenger.

In some implementations, determining whether the current passengers in the vehicle and the passengers identified in the second data are the same people by comparing the fourth data to the second data in the data set of pre-registered border crossers may include determining that at least some of the current passengers in the vehicle and the passengers identified in the second data are the same people and are authorized to cross the particular border. Determining whether the current passengers in the vehicle and the passengers identified in the second data are the same people by comparing the fourth data to the second data in the data set of pre-registered border crossers may include determining that at least some of the current passengers in the vehicle and the passengers identified in the second data are the same people and are not authorized to cross the particular border. Determining whether the current passengers in the vehicle and the passengers identified in the second data are the same people by comparing the fourth data to the second data in the data set of pre-registered border crossers may include determining that at least some of the current passengers in the vehicle and the passengers identified in the second data are not the same people, and determining, for each of the at least some of the current passengers in the vehicle, an identify of the current passenger by accessing a database of people using the fourth data for the current passenger.

In some implementations, determining whether the current passengers in the vehicle and the passengers identified in the second data are the same people may include comparing, for each of the current passengers, the fourth data for the current passenger with the second data identifying the passengers for the vehicle, determining, for each of the current passengers, whether the fourth data for the current passenger matches data for one of the passengers from the second data in response to comparing the fourth data for the current passenger with the second data identifying the passengers for the vehicle, and determining that each of the current passengers is one of the passengers for the vehicle and that no additional or fewer people are in the vehicle in response to determining, for each of the current passengers, that the fourth data for the current passenger matches data for one of the passengers from the second data. Determining that each of the current passengers is one of the passengers for the vehicle and that no additional or fewer people are in the vehicle may include receiving data from one or more sensors that indicates that no additional people are currently in the vehicle. Receiving the data from the one or more sensors that indicates that no additional people are currently in the vehicle may include receiving data from one or more cameras. Receiving the data from the one or more sensors that indicates that no additional people are currently in the vehicle may include receiving data from one or more heat sensors.

In some implementations, determining, using the first data identifying the passengers, whether each of the passengers for the vehicle is authorized to cross the particular border may include determining whether each of the passengers has a visa to enter an area adjacent to the particular border to which the border crossing station provides access. Determining, using the first data identifying the passengers, whether each of the passengers for the vehicle is authorized to cross the particular border may include determining whether any of the passengers are on a watch list that indicates persons of interest, and providing the instructions to guide the vehicle to the lane at the border crossing station comprises providing the instructions to guide the vehicle to the lane at the border crossing station in response to determining that none of the passengers are on the watch list that indicates persons of interest.

In some implementations, the method may include determining a type of the vehicle, and selecting the lane using the type of the vehicle, wherein providing the instructions to guide the vehicle to the lane at the border crossing station comprises providing the instructions to guide the vehicle to the lane at the border crossing station in response to selecting the lane using the type of the vehicle. Providing the instructions to guide the vehicle to the lane at the border crossing station may include providing the instructions to an automated display to cause the automated display to present information to guide the vehicle to the lane at the border crossing station. The method may include determining that a predetermined amount of time has passed since storing the second data in the data set of pre-registered border crossers, and removing the second data from the data set of pre-registered border crossers. Receiving the first data identifying the vehicle and the passengers for the vehicle that are requesting to cross the particular border may include receiving the first data identifying the vehicle and passengers for the vehicle that are requesting to cross the particular border.

In some implementations, a system may include a computer terminal that includes a second data processing apparatus, and a second non-transitory computer readable storage medium in data communication with the second data processing apparatus and storing instructions executable by the second data processing apparatus and upon such execution cause the second data processing apparatus to perform operations, e.g., a method, that include receiving, for at least one of the three or more vehicles, an identifier of the vehicle and data identifying the passengers of the vehicle, and sending, to the data processing apparatus, the first data including the identifier of the vehicle and the data identifying the passengers of the vehicle. The system may include a camera to capture image data representing an image of one of the three or more vehicles and send the image data to the data processing apparatus. Receiving, for each of the three or more vehicles and from one or more first sensors, third data identifying the vehicle and indicating entry of the vehicle into the border crossing station that provides access to the particular border may include receiving, for the one of the three or more vehicles, the image data representing the image of the vehicle from the camera. The method may include analyzing the image data to identify the vehicle shown in the image. The system may include a vehicle detector to detect movement of a vehicle, and cause the camera to store image data representing an image of the vehicle in response to detecting movement of the vehicle.

In some implementations, a method may include determining, for each of the three or more vehicles, a type of the vehicle, and determining navigation instructions for the vehicle at the border crossing station using the type of the vehicle. Determining the type of the vehicle may include determining a size of the vehicle, a type of content typically transported by the vehicle, or a transparency of a window in the vehicle. Determining navigation instructions for the vehicle at the border crossing station using the type of the vehicle may include, in response to determining that the vehicle is a passenger van, providing instructions for presentation of directions to cause the passenger van to move past an aerial camera to allow the aerial camera to capture image data for some of the current passengers in the passenger van. Determining navigation instructions for the vehicle at the border crossing station using the type of the vehicle may include, in response to determining that the vehicle is a car, providing instructions for presentation of directions to cause the car to move past a stationary camera to allow the stationary camera to capture image data for some of the current passengers in the car. Determining navigation instructions for the vehicle at the border crossing station using the type of the vehicle may include, in response to determining that the vehicle has one or more windows that are not transparent, providing instructions for presentation of directions to cause the vehicle to move to the third lane at the border crossing station at which a guard manually inspects the vehicle and the passengers in the vehicle.

In some implementations, a system may include a data set of pre-registered border crossers that includes records that each identify a vehicle and passengers for the vehicle, and indicate whether each of the passengers is authorized to cross a corresponding border. The system may include a controller that operates the gate for the first lane. Automatically opening the gate for the first lane to allow passage of the vehicle through the gate without requiring manual inspection of the vehicle or the passengers may include sending, by the data processing apparatus to the controller, instructions to cause the controller to open the gate to allow only the corresponding first vehicle to pass through the gate and close the gate once the corresponding first vehicle has passed through the gate. Providing the instructions to guide the vehicle to the second lane at the border crossing station may include providing instructions to guide the second vehicle to a particular lane at the border crossing station. Providing the instructions to guide the vehicle to a third lane at the border crossing station at which a guard manually inspects the vehicle and the passengers may include providing instructions to guide the third vehicle to the particular lane at the border crossing station. The method may include determining that a specific passenger in a particular vehicle from the three or more vehicles is not eligible for automated entry to the particular border, and providing instructions to guide the particular vehicle to the third lane at the border crossing station.

The subject matter described in this specification can be implemented in particular embodiments and may result in one or more of the following advantages. In some implementations, an automated border inspection system may more accurately identify travelers; automate vehicle classification, identification, or both; enhance an ability to identify and respond to high risk travelers; or a combination of two or more of these, compared to other systems. In some implementations, the automated border inspection system may ensure that all of the same databases are searched when determining, for each passenger who pre-registers to cross a border, whether the passenger, and the vehicle in which they are travelling, is authorized to cross the border. In some implementations, an automated border inspection system may ensure that the same checks and analysis are perform for all passengers, vehicles, or both. In some implementations, an automated border inspection system may maintain a log that associates registration information with biometric data of passengers who entered a border crossing for later use, e.g., validation. In some implementations, an automated border inspection system with infrared detectors may more accurately determine vehicle occupancy or facilitate a vehicle occupancy determination compared to other systems. In some implementations, an automated border inspection system may more efficiently use resources, e.g., physical space, budget, personnel, or a combination of two or more of these, compared to other systems. In some implementations, an automated border inspection system may automate border crossings to expedite travel or trade, or both, that are both authorized and pre-registered. In some implementations, an automated border inspection system may reduce or eliminate the wait time for a particular vehicle, and the passengers in the particular vehicle, at a particular border crossing.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of a process for determining whether a vehicle and its passengers may use an automated border crossing process.

Like reference numbers and designations in the various drawings indicate like elements.

DETAILED DESCRIPTION

In some implementations, an automated border inspection system receives travel information from travelers and links information about the travelers with their vehicles. The automated border inspection system may receive the travel information from a kiosk, or another computer, at a motorway stop, e.g., a gas station, rest stop, service stations, and store the information in a database. While the travelers are in route to a border crossing, the automated border inspection system determines whether the travelers are authorized to cross the border, e.g., pre-vets the travelers.

Once the travelers reach the border while in their vehicle, the automated border inspection system identifies the vehicle, confirms that the passengers in the vehicle are the people who were pre-vetted for the vehicle and determines whether the passengers are authorized to cross the border. Depending on the result of the confirmation and the determination, the automated border inspection system guides the vehicle through an automated lane, a semi-automated lane, or a non-automated lane. For instance, the automated border inspection system may cause presentation of the instructions on a sign or provide instructions to a device operated by a passenger in a vehicle informing the passenger which lane to take, e.g., using a web browser, a particular application, an email, or a text message.

Figure 1A:
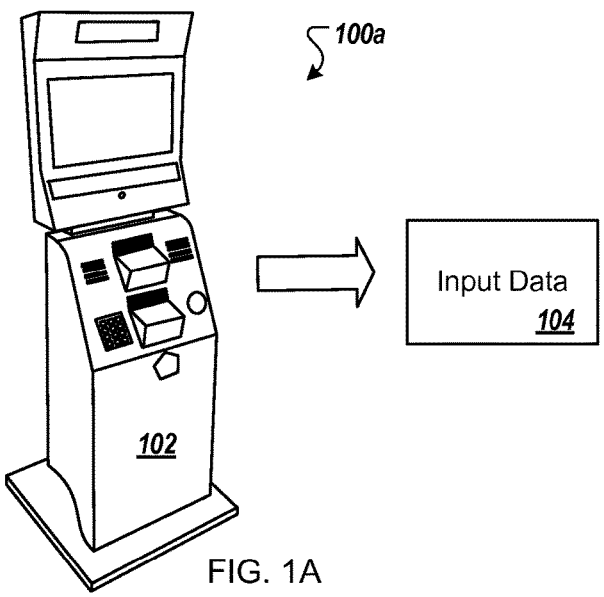
FIGS. 1A-C show examples of environments in which an automated border inspection system pre-vets passengers that are requesting to cross a border.
Figure 1B:
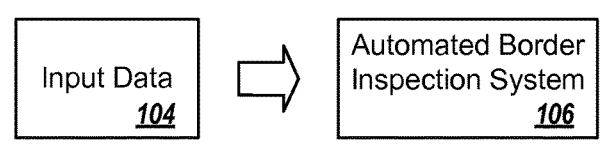
Figure 1C:
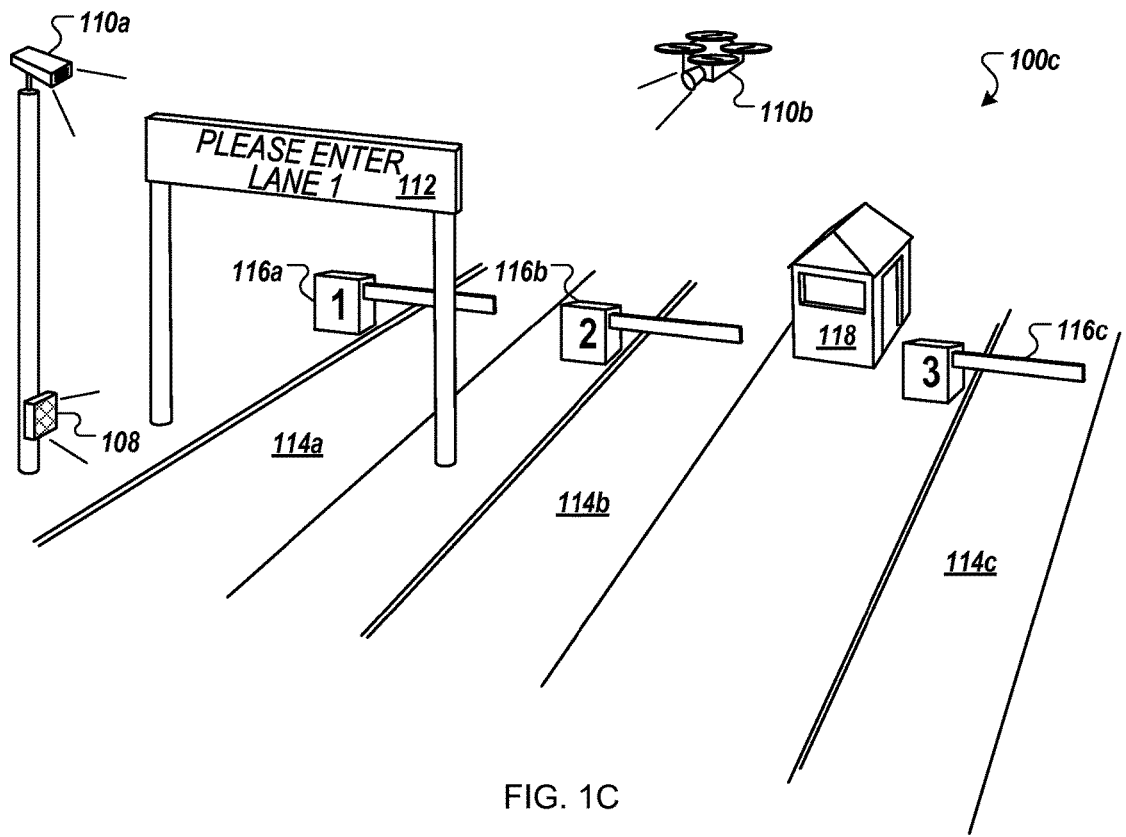

FIGS. 1A-C show examples of environments 100a-c in which an automated border inspection system pre-vets passengers that are requesting to cross a border. For example, as shown in FIG. 1A, a kiosk 102 in the environment 100a receives input data 104 during a first time period. The kiosk 102 may be physically located at a gas station, rest stop, service station, or another location at which travelers may stop on their way to a destination, e.g., when the destination is in a different state or country from the physical location of the kiosk 102.

The kiosk 102 may receive input data 104 that identifies each passenger who will be in a particular vehicle crossing the border. For instance, the kiosk 102 may include one or more sensors, e.g., an infrared sensor or an image scanning sensor, that detect passport information, e.g., for each of the passengers, in response to a passenger placing a passport in front of a sensor.

The kiosk 102 may include a camera to capture an image of each of the passengers, a fingerprint scanner or a retinal scanner, or two or more of these in addition to other types of biometric identification devices. In some examples, the camera may be used to determine iris information for one or more of the passengers and the kiosk 102 may include the iris information in the input data 104.

The kiosk 102 may receive visa information for one or more of the passengers, vehicle registration information, e.g., number plate or license plate information, and other types of travelling information, e.g., via scanner, keyboard, camera, or a combination of these. In some implementations, the kiosk 102 may receive an intended border crossing point from a passenger.

The kiosk 102 sends the input data 104 to an automated border inspection system 106 that analyzes the input data 104, for the particular vehicle, to pre-vet the passengers of the particular vehicle. For instance, the automated border inspection system 106 determines whether the passengers, the particular vehicle, or both, are authorized to cross the border as shown in the environment 100b of FIG. 1B. The automated border inspection system 106 may verify the authenticity of any visas for the passengers and use the identification information to determine whether the passengers are allowed to travel out of the current physical region, travel to another physical region across the border, or both, as described in more detail below. The automated border inspection system 106 analyzes the input data 104 while the particular vehicle is in route to the border crossing.

In the environment 100c shown in FIG. 1C, when the particular vehicle arrives at the border crossing, a sensor 108, e.g., a motion sensor, detects the movement of the particular vehicle and causes a camera 110a or an aerial camera 110b to capture an image of the particular vehicle. The automated border inspection system 106 receives image data for the particular vehicle from the camera 110a or the aerial camera 110b and determines a vehicle identifier for the particular vehicle, e.g., a license plate number.

The automated border inspection system 106 uses the vehicle identifier to determine the whether the current passengers in the vehicle were pre-vetted for crossing the border while the particular vehicle was in route to the border crossing. For instance, when the automated border inspection system 106 determines that the current passengers in the particular vehicle are the passengers that were pre-vetted for crossing the border in the particular vehicle, the automated border inspection system 106 causes a sign 112 to display a message to a driver in the particular vehicle indicating which lane 114a-c at the border crossing the vehicle should use.

When the automated border inspection system 106 determines that the passengers and the particular vehicle are authorized to cross the border, the automated border inspection system 106 generates a message indicating that the particular vehicle should use a first lane 114a to cross the particular border. In some examples, the first lane 114a is a primary inspection lane.

The automated border inspection system 106 detects entry of the particular vehicle in the first lane and causes a first gate 116a to open to allow the particular vehicle to cross the border. After allowing the particular vehicle to pass through the first gate 116a, the automated border inspection system 106 causes the first gate 116a to close to prevent additional vehicles from crossing the border without determining whether the additional vehicles and their passengers are authorized to cross the border.

In some examples, the automated border inspection system 106 may determine that a subsequent vehicle, and its passengers, are authorized to cross the border and not close the first gate 116a. In these examples, the automated border inspection system 106 may keep the first gate 116a open until the automated border inspection system 106 detects an unauthorized vehicle or a vehicle with at least one passenger who has not been authorized or verified as authorized to cross the border, e.g., in the primary inspection lane, at which time the automated border inspection system 106 causes the first gate 116a to close to prevent the vehicle from crossing the border.

The automated border inspection system 106 may provide instructions to a device operated by a guard at the border crossing station instructing the guard to inspect the vehicle. In response, the automated border inspection system 106 may receive data from a device operated by the guard, the same device or a different device which presented the instructions to the guard, that indicates whether or not the vehicle should be allowed to cross the border. When the data indicates that the vehicle should be allowed to cross the border, the automated border inspection system 106 causes the first gate 116a to open.

When the automated border inspection system 106 is unable to determine information for one or more current passengers in a vehicle, the automated border inspection system 106 may cause the sign 112, or another sign, to present a message indicating that the vehicle should drive through a second lane 114b at the border crossing. For instance, the automated border inspection system 106 may cause the aerial camera 110b to capture images of two passengers in a vehicle and determine that there is a third passenger in the vehicle, e.g., using image data from the aerial camera 110b. The automated border inspection system 106 may compare the image data for the two passengers with image data for pre-vetted passengers and determine that the two passengers are authorized to cross the border. The automated border inspection system 106 may determine that the image data for the third person cannot be compared to image data for pre-vetted passengers, e.g., the image data is for the side or back of the third person's head, and that a guard needs to manually inspect the vehicle to determine whether the third person is authorized to cross the border.

Upon receipt of data indicating that the third person is authorized to cross the border, the automated border inspection system 106 causes a second gate 116b for the second lane 114b to open to allow the vehicle to cross the border. The second lane may be a primary inspection lane, e.g., with a guard assigned to the second lane 114b.

In some examples, the border crossing station may have roving guards that assist passengers in multiple lanes. For example, when the first lane 114a and the second lane 114b are primary inspection lanes, the automated border inspection system 106 may allow all vehicles to pass through the lanes, e.g., by opening the corresponding gates or leaving the gates open, until the automated border inspection system 106 detects a vehicle which needs further inspection, e.g., of one or more passengers or the vehicle. The automated border inspection system 106 may cause the vehicle that needs further inspection to stop at the border crossing, e.g., by having a gate for the second lane 114b to close or stay closed, and provide instructions to a device operated by a roving guard indicating that the vehicle needs further inspection, e.g., to cause the guard to go to the vehicle and verify that the passengers in the vehicle are authorized to cross the border.

In some examples, when the automated border inspection system 106 detects a vehicle that has not been pre-vetted or is not authorized or at least one passenger in a vehicle who is not authorized or not pre-vetted or cannot determine whether a particular passenger has been pre-vetted, the automated border inspection system 106 provides instructions to cause the particular vehicle to access a third lane 114c at the border crossing that is not automated. The third lane 114c may be a secondary inspection lane, e.g., located near a guard house 118.

The automated border inspection system 106 may provide instructions to a device operated by a guard, e.g., physically located in the guard house 118, to cause the guard to inspect the vehicle and the passengers in the vehicle. In response, the automated border inspection system 106 may receive input from a device operated by the guard indicating whether or not the vehicle and the passengers in the vehicle are authorized to cross the border. If the vehicle and the passengers in the vehicle are authorized to cross the border, the automated border inspection system 106 causes a third gate 116*c* for the third lane 114*c* to open to allow the vehicle to cross the particular border.

In some implementations, the third lane 114*c* may not allow a vehicle to cross the border. For example, the third lane 114*c* may provide access to an inspection area at the border crossing station to allow a guard to inspect a vehicle parked in the inspection area. When the automated border inspection system 106 receives an indication from a device operated by the guard that the vehicle and its passengers are authorized to cross the border, the automated border inspection system 106 may provide instructions to a device operated by a passenger in the vehicle to cause presentation of a user interface letting the passenger know how to cross the border, e.g., which lane to use to cross the border. The automated border inspection system 106 may cause a gate to open or remain open to allow the vehicle to use the lane to cross the border.

In some examples, when the automated border inspection system 106 determines that a particular vehicle is authorized to cross the border and is unable to verify that one of the passengers in the particular vehicle has been pre-vetted, the automated border inspection system 106 may provide instructions, e.g., to the sign 112 or a device operated by a passenger in the particular vehicle. The automated border inspection system 106 may provide instructions to a device operated by a guard indicating which passenger or passengers where not verified so that the guard verifies that those passengers are authorized to cross the border, e.g., and not the other passengers. In some examples, the automated border inspection system 106 provides instructions indicating that the guard should verify that each of the passengers is authorized to cross the border, e.g., determine that each passenger in the vehicle matches a name on a list of pre-vetted passengers for the vehicle.

In some implementations, the sign 112 may have a fixed message, e.g., that does not change, which directs vehicles that enter the border crossing station to particular lanes. For instance, the sign 112 may direct vehicles with passengers who have pre-registered at a kiosk to go to lanes 114*a-b* and vehicles with passengers who have not pre-registered at a kiosk to go to the third lane 114*c*.

In some examples, the kiosk 102 may provide a passenger with a message, e.g., on a display or on a printout, indicating a lane for the passenger's vehicle to use at a border crossing station. For instance, the message may indicate that the vehicle should use a particular lane, e.g., the second lane 114*b*, or may use any of a group of lanes, e.g., the lanes 114*a-b*. The border crossing station may include a sign, e.g., the sign 112 or another sign, indicating that vehicles that have not pre-registered should use a particular lane or a particular group of lanes, e.g., the third lane 114*c*.

When a vehicle arrives at the border crossing station, the automated border inspection system detects the vehicle, e.g., using the sensor 108, and determines in which lane the vehicle is located. If the vehicle is in a pre-registered lane, the automated border inspection system determines whether the passengers in the vehicle and the vehicle are pre-registered and authorized to cross the border, e.g., by capturing images of the vehicle and the passengers using the camera 110*a* or the aerial camera 110*b*. When the automated border inspection system determines that the passengers and the vehicle are authorized to cross the border, the access control system causes a gate for the lane in which the vehicle is located to open to allow only the vehicle, and no additional vehicles, to cross the border.

When the automated border inspection system determines that one of the passengers, the vehicle, or both, is not authorized to cross the border, the automated border inspection system generates instructions to cause a guard to inspect the vehicle, to direct the vehicle to a particular area, e.g., a secondary inspection area, or both. For instance, the automated border inspection system may provide instructions indicating the lane in which the vehicle is located and information about the vehicle and its passengers to a mobile device to cause a guard to manually inspect the vehicle.

In some implementations, the sign 112 may indicate, for a specific vehicle, the particular lane in which the vehicle should go. For instance, the sign 112 may present a vehicle plate number and a lane for the vehicle.

In some implementations, the automated border inspection system may dynamically allocate lanes to vehicles. For instance, the automated border inspection system may determine whether or not a vehicle is pre-registered and direct a vehicle that is not pre-registered to a particular lane. For each vehicle that is pre-registered, the automated border inspection system may determine whether the passengers in the vehicle are the pre-registered passengers for the vehicle and authorized to cross the border. If so, the automated border inspection system directs the vehicle to a lane with a shortest wait time. If one of the passengers in the vehicle is not authorized to cross the border or cross the border using an automated process, the vehicle is not authorized to cross the border, or the automated border inspection system is unable to verify that a particular current passenger pre-registered for automated crossing, the automated border inspection system may direct the vehicle to the particular lane or another lane with a longer wait time, e.g., at which a guard will manually determine whether the vehicle and the passengers may cross the border.

In some implementations, the automated border inspection system may perform an initial analysis of the passengers for a vehicle, the vehicle, or both, while the vehicle is at a physical area near the kiosk 102. The kiosk 102 may provide a passenger for the vehicle with an identifier to use to determine in which lane the vehicle should go at the border crossing station. The identifier may be a general identifier, e.g., use the letter "z" to determine which lane to access, or an identifier for a lane. While the vehicle is in route to the border crossing station, the automated border inspection system may further process information for the vehicle and the passengers to determine whether the vehicle may use an automated border crossing process, are authorized to cross the border, or both. When the automated border inspection system determines that the vehicle is at the border crossing station, the automated border inspection system may guide the vehicle to a particular lane, e.g., "vehicle with identifier z should use lane five." In some examples, the kiosk may provide the identifier to a passenger without the automated border inspection system performing an initial analysis of the vehicle, the passengers, or both.

In some implementations, all of the lanes 114*a-c* are primary inspection lanes. For instance, the automated border inspection system allows vehicles to enter any lane at the border crossing station. While the vehicle is waiting to arrive at the corresponding gate 116*a-c* for the lane, the automated border inspection system captures images of the vehicle and the passengers in the vehicle. When the automated border inspection system determines that the vehicle and the passengers in the vehicle are authorized to cross the border, e.g., for vehicles and passengers who pre-registered, the automated border inspection system causes the corresponding gate to open to allow the vehicle and its passengers to cross the border.

When the automated border inspection system determines that one or more of the passengers in a vehicle cannot be verified, e.g., the aerial camera 110b cannot capture image data for a passenger or the vehicle or one of the passengers is not pre-registered for automated crossing, the automated border inspection system may generate instructions to cause a guard to inspect the vehicle and determine whether the vehicle and its passengers are authorized to cross the border. The instructions may include information about the vehicle, the passengers in the vehicle, e.g., who were not verified, or both. In some examples, the automated border inspection system may generate instructions to cause the vehicle to go to a secondary inspection area when a passenger in the vehicle cannot be verified. For instance, the first gate 116a may include a sign that indicates that the vehicle, located in the first lane 114a, should go to a secondary inspection area physically located after the first gate 116a.

When a passenger or the vehicle is not authorized, e.g., based on a determination made by the automated border inspection system or a guard, the automated border inspection system may generate instructions to cause the vehicle to go to a secondary inspection area. For instance, the automated border inspection system may detect a vehicle that is not pre-registered and cause a guard to inspect the vehicle, e.g., by providing instructions to a device operated by the guard to cause the guard to determine whether the passengers and the vehicle are authorized to cross the border. The automated border inspection system may receive data from the device operated by the guard, or another device, indicating that further analysis of the passengers, the vehicle, or both, are required and, in response, the automated border inspection system generates the instructions to cause the vehicle to go to the secondary inspection area.

Figure 2:
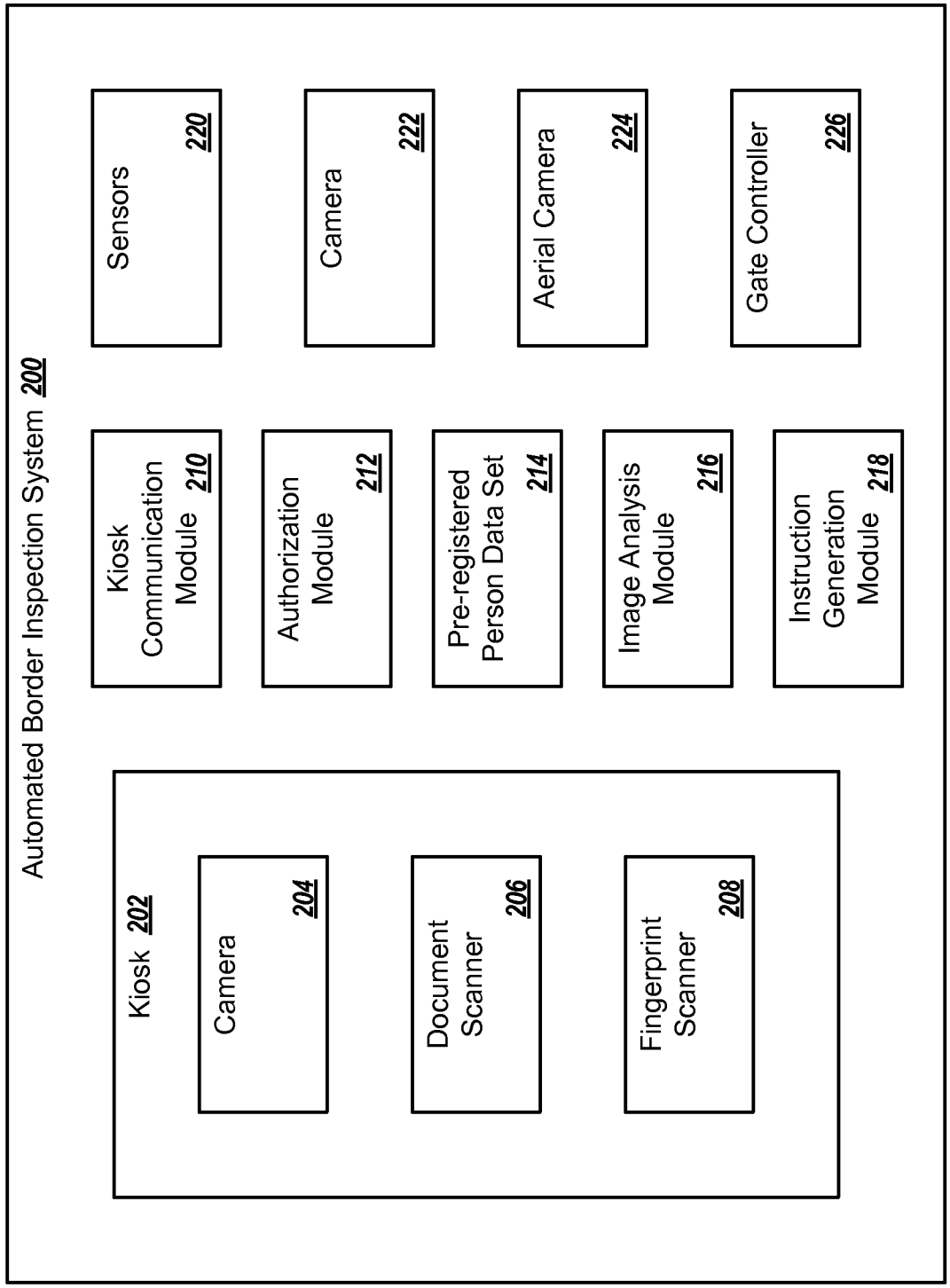
FIG. 2 is an example of an automated border inspection system.

FIG. 2 is an example of an automated border inspection system 200. The automated border inspection system 200 includes a kiosk 202. In some implementations, the automated border inspection system 200 is connected to the kiosk 202 via a network and does not include the kiosk 202. The kiosk 202, or another computer, allows a passenger of a vehicle to request authorization to cross a border before arriving at a border crossing station for the border.

The kiosk 202 may include a camera 204 that captures an image of the face of the passenger, iris information for the passenger, e.g., using an infrared camera, an image of the vehicle, or a combination of these. For instance, the camera 204 may capture an image of the vehicle that includes a vehicle plate number, e.g., a license plate number.

The kiosk 202 may include a document scanner 206 that allows the kiosk to scan a passenger's documents, such as a driver's license, a visa, a passport, vehicle registration information, or a combination of two or more of these. The document scanner 206 may scan images of documents and, using software installed on the kiosk 202, determine text included in the images. The document scanner 206 may scan bar codes, quick response codes, or other types of codes to determine information included in a passenger's documents. The document scanner 206 may provide images of scanned documents, images and text, only the corresponding text, or codes to the kiosk 202 for transmission to other portions of the automated border inspection system 200, e.g., as the input data.

The kiosk 202 may include a fingerprint scanner 208, e.g., as another biometric data gathering device in addition to the camera 204. In some examples, the kiosk 202 may include additional biometric data gathering devices, e.g., a microphone. The fingerprint scanner 208 may capture fingerprint information from a passenger of a vehicle.

Any of the input devices, e.g., the camera 204, the document scanner 206, the fingerprint scanner 208 and additional data gather devices such as a keyboard, may receive data from one or more passengers for a single vehicle. For instance, the kiosk 202 may receive passport or driver's license information from a parent using the document scanner and identification information for a child from a keyboard, e.g., via input entered by the parent, and the camera 204, e.g., an image of the child's face.

In some implementations, the kiosk 202 may prompt a passenger for destination or border crossing information. For instance, the kiosk 202 may prompt a passenger to enter a name for a border crossing station at which the passenger intends to enter another region, e.g., state or country. The passenger may be the driver of the vehicle that will cross at the border crossing station or another passenger of the vehicle.

The kiosk 202 may include a submit button, either a physical button or a soft button on a display. Upon receipt of a selection of the submit button, the kiosk 202 may verify that all required information for a vehicle has been entered, e.g., the vehicle number and information for the passengers.

In some examples, the kiosk 202 may determine the required information based on a destination or border crossing and whether the required information has been received. For instance, the kiosk 202 may determine that visa information is required to enter the region to which a passenger is requesting authorization to access or a region accessed at a border station at which the passenger intends to cross. The kiosk 202 may determine whether the kiosk 202 received visa information for all of the passengers in the vehicle and, if not, request the visa information from a passenger.

Upon determining that all the required information has been received, the kiosk 202 provides the data about the vehicle and the passengers, and optionally the intended destination region or border crossing to which the vehicle is heading, to a kiosk communication module 210. The kiosk communication module 210 is at a physical location remote from a physical location of the kiosk 202. For instance, the kiosk communication module 210 is included in a server and communicates with the kiosk 202 via a network. The network may be a local area network (LAN), wide area network (WAN), the Internet, or a combination thereof.

The kiosk communication module 210 provides the data about the vehicle and the passengers, for a particular vehicle, to an authorization module 212, e.g., located in the same server or group of servers as the kiosk communication module 210. The authorization module 212 analyzes the data for the particular vehicle to determine whether the vehicle, the passengers, or both, are authorized to cross a border to access an intended destination or to cross at the identified border crossing.

For example, the authorization module 212 may access a local database, a remote database, or both, to determine whether the particular vehicle, one or more passengers of the particular vehicle, or both, are authorized to cross the border. The authorization module 212 may compare biometric data for each of the passengers, received from the kiosk, with biometric data in the database to determine if the corresponding passenger has a visa that indicates that the passenger may cross the border or go to the intended destination of the passenger. The database may include biometric data on visa applications and the authorization module 212 may determine whether the database includes an entry for the corresponding passenger and, if so, whether the database indicates that the passenger has a visa to enter the destination or cross the border.

In some examples, the authorization module 212 may use the biometric data to determine whether any of the passengers is on a watch list or identified as a person of interest, e.g., in a persons of interest database. The authorization module 212 may use a type of watch list on which a person is listed or a type of a persons of interest when determining whether to grant a passenger authorization to cross a border or access a destination. For instance, the authorization module 212 may grant a passenger who is prohibited from driving authorization to cross a border when the passenger is traveling with other passengers, e.g., because one of the other passengers is likely driving, and not grant authorization to the passenger when the passenger is traveling alone. In some examples, the authorization module 212 may authorize a person who is a government employee or an ambassador in response to determining that the person is identified on a corresponding list.

The authorization module 212 may determine whether the vehicle is listed on a watch list, e.g., is stolen, or owned by a person of interest. The authorization module 212 may query a local database, a remote database, or both, to determine whether the vehicle is listed on a watch list. In some examples, the authorization module 212 may determine whether the vehicle number plate matches the description of the vehicle, e.g., the vehicle number plate is registered for the vehicle to which the plate is attached and not another vehicle.

In some implementations, the authorization module 212 may determine whether a passport, driver's license, visa, or two or more of these, is listed on a watch list. The watch list may indicate whether the corresponding document is stolen or reported as missing. The authorization module 212 may determine whether a passport, driver's license, or visa, or two or more of these, is valid, e.g., not falsified and not expired.

In some examples, the authorization module 212 may query different databases depending on the identification information received. For instance, the authorization module 212 may query a first database to validate information in an e-passport and may query a second database and a third database to validate information in a passport, and query the third database and a fourth database to validate information in a driver's license.

The authorization module 212 may determine whether the vehicle, the passengers in the vehicle, or both, are authorized to cross a particular border. The authorization module 212 may determine whether each of the passengers in a vehicle is authorized to cross a particular border. For instance, a first group of passengers in a vehicle may be authorized to cross a first border and a second group of passengers in the vehicle may be authorized to cross a second, different border. The authorization module 212 may determine that a border request is for the first border and that the passengers in the second group, who are not in the first group, are not authorized to cross the first border.

In some examples, the authorization module 212 might not query a database to determine whether some of the passengers in a vehicle are authorized to cross a border. For instance, the authorization module 212 may determine an age of each of the passengers in a vehicle. For each of the passengers with an age that satisfies a threshold age, the authorization module 212 queries a database to determine whether the passenger is authorized to cross the border. For each of the passengers with an age that does not satisfy the threshold age, the authorization module 212 does not query a database to determine whether the passenger is authorized to cross the border. For example, the authorization module 212 may determine that these passengers are children and should be allowed to cross the border without verifying identification information, visa information, or both, for the children.

In some examples, the authorization module 212 may receive age information from the kiosk communication module 210, e.g., received by the kiosk 202 from a passenger, and validate the age information. For instance, the authorization module 212 may query a database to determine whether there is a match for a person with a particular name that is a particular age. When the authorization module 212 determines that the age for a person is accurate and that the age does not satisfy the threshold value, e.g., the person is a child, the authorization module 212 might not query additional databases for authorization information, e.g., and determine that the person is authorized to cross the border.

In some implementations, the authorization module 212 may determine whether the vehicle, the passengers in the vehicle, or both, are authorized for automated or semi-automated border crossing. For example, the authorization module 212 may determine whether the vehicle has tinted or blacked out windows, is a large van or truck with a storage area that should be inspected, or has not complied with automated or semi-automated border crossing in the past and is not allowed to participate in automated or semi-automated border crossing.

The authorization module 212 may determine that the vehicle is a passenger van or a bus and can participate in semi-automated border crossing but not fully automated border crossing. For instance, the authorization module 212 may determine that a likelihood that one or more cameras will capture images of each of the passengers in the vehicle does not satisfy a threshold value and that a guard may need to verify the identity of some of the passengers. In response, the authorization module 212 determines that the vehicle is authorized for a semi-automated border crossing.

The authorization module 212 may determine that particular types of vehicles, such as motorcycles, are good candidates for automated border crossing. The authorization module 212 may determine that these types of vehicles, and their passengers, are authorized to participate in automated border crossing assuming the passengers and the vehicle are authorized to cross the particular border.

The authorization module 212 stores the results of the authorization determination in a pre-registered person data set 214. The automated border inspection system 200, e.g., the kiosk communication module 210 or the authorization module 212, may store other information about authorized vehicles, passengers, or both, in the pre-registered person data set 214. For instance, the authorization module 212 may store biometric data for the passengers of a particular vehicle, the vehicle plate number, and whether the vehicle and passengers are authorized to cross the particular border in a record in the pre-registered person data set 214. If at least one passenger is not authorized or if the vehicle is not authorized, to cross the particular border or for participation in an automated border crossing process, the authorization module 212 may indicate in the record that the vehicle and its passengers are not authorized, e.g., one value or flag for the entire record. In some examples, the authorization module 212 may include a value or flag for each person and a value or flag for the vehicle that each indicates whether the corresponding person or vehicle is authorized to cross the border or participate in an automated or semi-automated border crossing process.

The automated border inspection system 200 includes one or more sensors 220. Some of the sensors 220 may be configured to detect entry of a vehicle at a border crossing station. The sensors 220 may include motion sensors, pressure sensors, e.g., in a road, or other types of sensors that can determine that a vehicle is at a border crossing station.

In response to detecting a vehicle at the border crossing station, the sensors 220 may activate a camera 222 or an aerial camera 224 to capture images of the passengers in the vehicle and of the vehicle number plate. The images may be visible light images, infrared images, or both. The camera that captured the images provides image data representing the images to the automated border inspection system 200, e.g., an image analysis module 216.

The image analysis module 216 uses the image data of the vehicle number plate to identify a record in the pre-registered person data set 214 for the vehicle. When the image analysis module 216 determines that the pre-registered person data set 214 does not include a record for the vehicle, e.g., the pre-registered person data set 214 does not include a record with the vehicle's plate number, the instruction generation module 218 generations instructions to guide the vehicle to a non-automated lane. For example, the instruction generation module 218 may generate instructions to guide the vehicle to a secondary inspection lane or a lane at which a guard will determine whether the vehicle and the passengers in the vehicle are authorized to cross the particular border.

When the image analysis module 216 identifies a record for the vehicle, the image analysis module 216 identifies biometric data included in the record for the pre-registered passengers of the vehicle. The image analysis module 216 analyzes the image data to determine whether the biometric data in the pre-registered person data set 214 matches the image data for the current passengers in the vehicle. The image analysis module 216 may use any appropriate method to determine whether the biometric data matches the image data for the passengers in the vehicle.

In response to determining that the biometric data matches the image data for the passengers in the vehicle, the image analysis module 216 provides information about the vehicle to an instruction generation module 218. For instance, the image analysis module 216 may provide an identifier for a record in the pre-registered person data set 214 to the instruction generation module 218.

The instruction generation module 218 uses the record in the pre-registered person data set 214 to determine whether the vehicle and its passengers are authorized for an automated border crossing process. The instruction generation module 218 may also use a result of the comparison, by the image analysis module 216, of the image data and the biometric data.

For instance, if the image analysis module 216 determines that all of the current passengers in a vehicle are represented in the biometric data for the record and the instruction generation module 218 determines that all of the passengers and the vehicle are authorized to cross the particular border, the instruction generation module 218 generates instructions to guide the vehicle through an automated border crossing lane, e.g., a primary inspection lane. The instruction generation module 218 may determine whether the passengers and the vehicle can participate in an automated or in a semi-automated border crossing process and use the result of that determination when generating instructions to guide the vehicle to a lane for crossing the border.

The instructions may be instructions that cause the presentation of a user interface on a device. The user interface presents driving instructions that indicate which lane or lanes the vehicle may use to cross the border. For instance, the instructions may cause a web browser or another application on the device to present the driving instructions. In some examples, the instructions are driving instructions that are presented on a sign at the border crossing station or on a device, e.g., the instructions are a body of a text message sent to the device.

When the automated border inspection system 200 determines that the vehicle is in the specified lane, a gate controller 226 may cause a gate to open to allow the vehicle to pass through the border station, e.g., without allowing any other vehicles to pass. In some examples, the gate controller 226 may keep the gate open until an unauthorized vehicle is detected and close the gate to prevent passage of the unauthorized vehicle through the border crossing station.

When the image analysis module 216 or the instruction generation module 218 determines that at least one of the current passengers in the vehicle cannot be identified, e.g., the aerial camera 224 cannot capture an image of the current passenger's face, or that the biometric data in the record for the vehicle does include data for a current passenger, the instruction generation module 218 may guide the vehicle to a semi-automated lane or another lane that is a secondary inspection lane. The instruction generation module 218 generations instructions to guide the vehicle to the semi-automated lane or the other lane and generates instructions to prompt a guard to inspect the vehicle and confirm the identity of the current passenger.

In some examples, when the image analysis module 216 has image data for a face of a passenger, the vehicle is pre-registered for crossing the border, and the pre-registered person data set 214 does not have biometric data for the passenger, the image analysis module 216 may send the image data to another system for further analysis. The other system may determine whether the person is included in a list of persons of interest or a watch list. The other system may be one of the systems with which the authorization module 212 communicates to determine whether pre-registered passengers are authorized to cross a border or may be the authorization module 212. If the passenger is on a list of persons of interest or a watch list, the instruction generation module 218 generates instructions to guide the vehicle to a secondary inspection lane.

In some implementations, the image analysis module 216 may analyze multiple images of each passenger. The image analysis module 216 may select a highest quality image and use the highest quality image to determine whether the corresponding passenger pre-registered with the automated border inspection system 200. The highest quality image may be selected using predetermined criteria, e.g., that indicate image features used to verify whether a passenger is authorized to cross a border.

In some examples, the image analysis module 216 may analyze each of the images of a particular passenger as part of a risk analysis process. The image analysis module 216, or another module in the automated border inspection system 200, may determine whether the behavior of the particular passenger is representative of a high risk individual who should not be allowed to participate in an automated border crossing process. In response to the image analysis module 216 determining that the particular passenger should not be allowed to participate in the automated border crossing process, the instruction generation module 218 generates instructions to guide the vehicle to a secondary inspection lane or instructions to prompt a guard to inspect a vehicle in which the particular passenger is riding or to interact with the particular passenger. For instance, the instructions may prompt the guard to determine whether the vehicle, the particular passenger and the other passengers in the vehicle are authorized to cross the border.

In some implementations, when the image analysis module 216 determines that one or more current passengers in a vehicle cannot be verified, the instruction generation module 218 may generate instructions to request a passenger of the vehicle to move the vehicle, e.g., so the camera 222 has a better angle at which to capture an image of the current passenger, to request that a passenger of the vehicle open a window of the vehicle, or to request that a passenger of the vehicle take some other action. In some examples, the instruction generation module 218 may generate instructions to cause the aerial camera 224 to capture an image of the current passenger that cannot be verified, e.g., so that the image analysis module 216 may use new image data from the image captured by the aerial camera 224 to determine whether the current passenger is authorized to cross the particular border. For instance, when the automated border inspection system 200 cannot use a first image taken by a fix camera to verify that a passenger is authorized to cross a border, the automated border inspection system 200 may cause the aerial camera 224 to capture a second image of the passenger. In some examples, the instruction generation module 218 generates instructions to guide the vehicle to a semi-automated border crossing lane at which a guard will determine whether the current passenger is authorized or instructions telling a guard to go to the vehicle and determine whether the current passenger is authorized.

In some implementations, the automated border inspection system 200 may determine a reason that the image analysis module 216 cannot verify the current passenger. For example, when there is a hardware error in the automated border inspection system 200, e.g., the camera 222 malfunctions, the instruction generation module 218 generates instructions to cause a guard to determine whether the passengers and the vehicle are authorized to cross the border. When the current passenger is preventing the capture of image data of the current passenger, the instruction generation module 218 generates instructions to cause a guard to determine whether the passengers and the vehicle are authorized to cross the border and updates a database to indicate that the current passenger is not authorized to participate in an automated border crossing process.

In some implementations, when the automated border inspection system 200 determines that a particular vehicle and group of passengers for the vehicle pre-registered for access to a border but did not show up at a border crossing station, the automated border inspection system 200 may prevent the particular vehicle, some of the passengers in the group of passengers, or both, from participating in an automated border crossing process. For instance, when the automated border inspection system 200 prevents each of the passengers in the group of passengers from participating in an automated border crossing process and one of the passengers later tries to participate in an automated border crossing process, e.g., at the kiosk 202, the authorization module 212 may prevent the participation, may determine that the passenger is not authorized to participate in an automated or semi-automated border crossing process after receipt of pre-vetting data for the passenger, or both.

In some implementations, the automated border inspection system 200 may periodically remove records from the pre-registered person data set 214. For instance, the automated border inspection system 200 may have an expiration period of time for each of the records, e.g., specific to each of the records or for all of the records. When the automated border inspection system 200 determines that the expiration period of time has passed since a group of passengers enrolled in a pre-vetting process, e.g., at the kiosk 202, and the group of passengers did not arrive at a border crossing, the automated border inspection system 200 removes a corresponding record from the pre-registered person data set 214. When the automated border inspection system 200 removes a record from the pre-registered person data set 214 and the automated border inspection system 200 later determines that the corresponding vehicle is at a border crossing station, the instruction generation module 218 generations instructions to guide the vehicle to a non-automated lane, e.g., as if the vehicle were never registered. In some examples, the automated border inspection system 200 may flag one or more people from the group of passengers as not able to participate in an automated or semi-automated border crossing process in response to determining that the expiration period of time has passed since a group of passengers enrolled in a pre-vetting process and did not arrive at a border crossing.

The automated border inspection system 200 may determine the expiration period of time using a physical of the kiosk 202, weather, traffic, information received during the registration process, or a combination of two or more of these. For instance, the automated border inspection system 200 may determine a first expiration period of time for a first kiosk five miles from a particular border station and a second, longer expiration period of time for a second kiosk thirty miles from the particular border station. In some examples, as part of the registration process, the automated border inspection system 200 may receive data indicating a time period during which the vehicle expects to be at the border crossing station, e.g., a particular day, planned vehicle stops between the physical location of the kiosk 202 and the border crossing station, or other information that the automated border inspection system 200 may use to determine the expiration period of time.

In some examples, the automated border inspection system 200 may use an intended destination of a passenger to determine a recommended border crossing station. The automated border inspection system 200 may use the physical location of the kiosk 202 to determine multiple routes to the intended destination, expected traffic at each of the border crossing stations on those routes, or both. The automated border inspection system 200 may select a preferred route from the routes and cause the kiosk 202 to present information about the preferred route. The automated border inspection system 200 may provide a list of some or all of the routes to the kiosk 202 and the kiosk 202 presents the list.

In some implementations, the automated border inspection system 200 may deny or prevent pre-registration from a particular kiosk, or device, that is outside of a threshold physical distance from a border to an intended destination of the passengers or from the intended border to which the passengers request authorization to cross. For example, when the automated border inspection system 200 receives a request for participation in a pre-vetting process from a mobile device operated by a passenger, the automated border inspection system 200 may use location information for the mobile device and determine whether the physical location of the mobile device is within the threshold physical distance from the border. If the physical location of the mobile device satisfies the threshold physical distance from the border, the automated border inspection system 200 allows the passenger to register in a pre-vetting process. If the physical location of the mobile device does not satisfy the threshold physical distance from the border, the automated border inspection system 200 prevents the passenger from registering in a pre-vetting process.

In some implementations, the automated border inspection system 200 takes an image of a vehicle and uses data from the image to determine whether the vehicle is authorized to access a particular area. For instance, the kiosk 202 may include a camera, e.g., the camera 204 or another camera, that captures an image of the vehicle. The authorization module 212 may use image data from the image to determine whether the vehicle identification information, e.g., vehicle plate number, entered by a passenger matches the vehicle represented by the image data, e.g., is registered for use on the vehicle represented by the image data. In some examples, the image analysis module 216 may analyze image data of a vehicle to determine whether the image data matches data describing a particular vehicle that is associated with a particular vehicle plate number.

Figure 3:
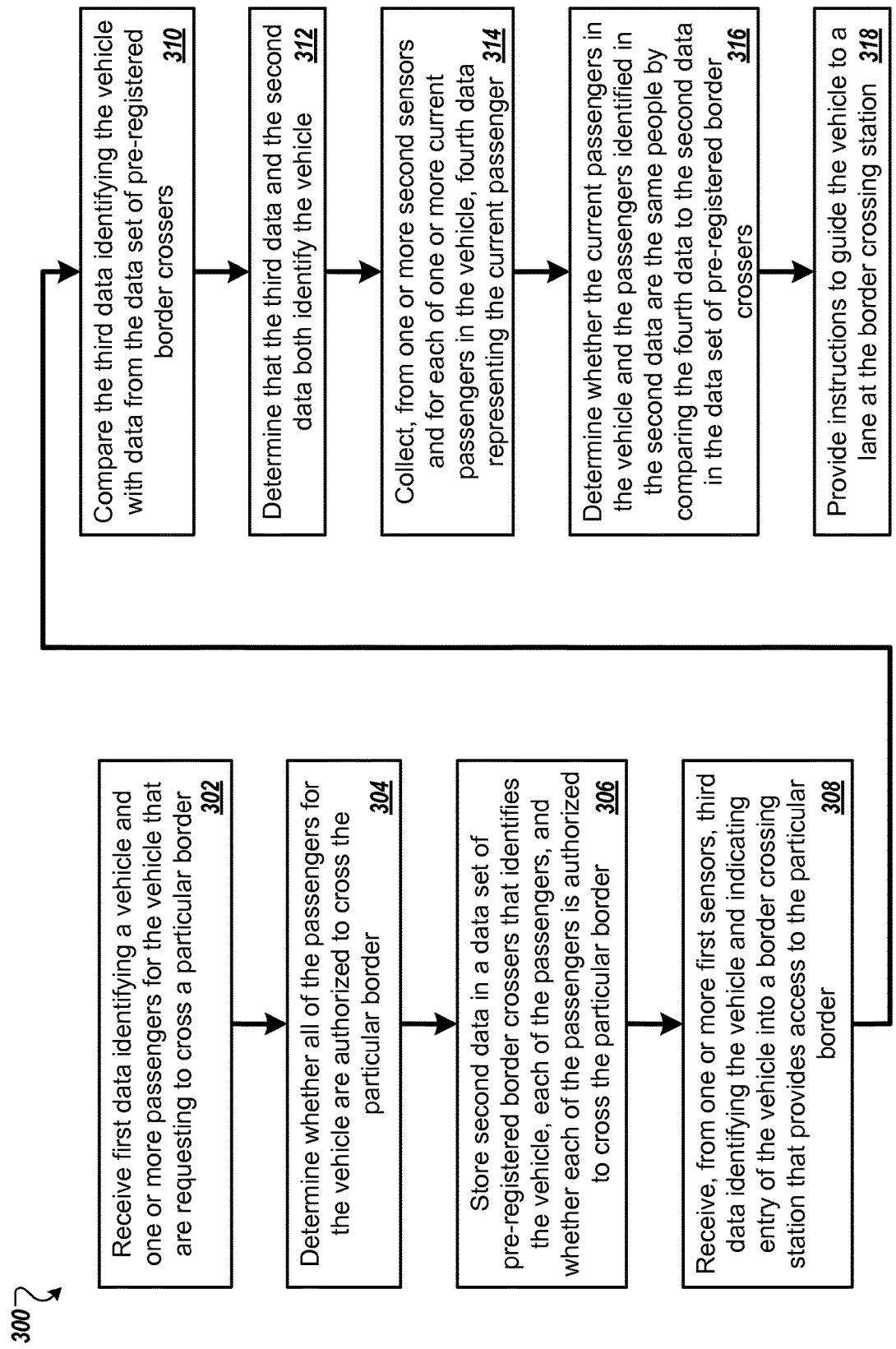
FIG. 3 is a flow diagram of a process for guiding a vehicle at a border crossing.

FIG. 3 is a flow diagram of a process 300 for guiding a vehicle at a border crossing. For example, the process 300 can be used by the automated border inspection system 200.

The automated border inspection system receives first data identifying a vehicle and one or more passengers for the vehicle that are requesting to cross a particular border (302). The first data may include biometric data, such as fingerprint information, face or iris image data, or a combination of these, for at least some of the passengers. The first data may include passport data, visa data, or both. In some examples, when the first data does not include at least some particular data, e.g., passport data or biometric data, for each of the passengers in a vehicle, e.g., based on a received number of passengers, the automated border inspection system prevents participation in a pre-vetting process. The first data for each of the vehicles may include an intended border crossing station at which the vehicle will cross, indication of the particular border, indication of a region accessed by crossing the particular border, e.g., a region to which access is requested, or a combination of two or more of these.

The automated border inspection system determines whether all of the passengers for the vehicle are authorized to cross the particular border (304). The automated border inspection system stores second data in a data set of pre-registered border crossers that identifies the vehicle, each of the passengers, and whether each of the passengers is authorized to cross the particular border (306). The second data may be a record or multiple records that together include information for each of the passengers of the vehicle and information for the vehicle, e.g., the vehicle plate number.

The automated border inspection system receives, from one or more first sensors, third data identifying the vehicle and indicating entry of the vehicle into a border crossing station that provides access to the particular border (308). The first sensors may be fixed, visible wavelength cameras. Other sensors, e.g., motion sensors, may trigger the cameras to capture images of the vehicle. A single sensor, e.g., camera, may capture data for the vehicle or multiple sensors may each capture separate data for the vehicle, e.g., separate images of the vehicle.

The automated border inspection system compares the third data identifying the vehicle with data from the data set of pre-registered border crossers (310). For instance, the automated border inspection system determines whether a vehicle plate number, identified in the third data, is in a record stored in the data set of pre-registered border crossers.

The automated border inspection system determines that the third data and the second data both identify the vehicle (312). The automated border inspection system collects, from one or more second sensors and for each of one or more current passengers in the vehicle, fourth data representing the current passenger (314). For example, one or more cameras capture images of the current passengers. A single camera may capture an image for one of the current passengers. In some examples, multiple cameras may each capture images for one of the current passengers. A single camera or multiple cameras may capture images of all of the passengers in a vehicle.

The automated border inspection system determines whether the current passengers in the vehicle and the passengers identified in the second data are the same people by comparing the fourth data to the second data in the data set of pre-registered border crossers (316). For example, the automated border inspection system may use any appropriate method to compare the image data of the current passengers with image data in the data set of pre-registered border crossers, or another database, to determine whether the current passengers are the passengers identified in the second data.

The automated border inspection system provides instructions to guide the vehicle to a lane at the border crossing station (318). For instance, the automated border inspection system determines the instructions using a result of the determination whether the current passengers are the same people as the passengers who pre-registered for the border crossing and for which the data set of pre-registered border crossers includes biometric data. The automated border inspection system may determine the instructions using information that indicates whether each of the passengers and the vehicle is authorized to cross the particular border. For example, the automated border inspection system may guide the vehicle to a first lane, e.g., a primary inspection lane, if all of the current passengers in the vehicle are authorized to cross the border. The automated border inspection system may guide the vehicle to a second lane, e.g., a secondary inspection lane, if one or more of the current passengers is not authorized to cross the border or if one or more of the pre-registered passengers, who might not be a current passenger in the vehicle, is not authorized to cross the border.

The order of steps in the process 300 described above is illustrative only, and the guidance of the vehicle at the border crossing can be performed in different orders. For example, the automated border inspection system may collect the fourth data, e.g., image data of the passengers, before or while receiving the third data, e.g., image data of the vehicle in which the passengers are travelling.

In some implementations, the process 300 can include additional steps, fewer steps, or some of the steps can be divided into multiple steps. For example, the automated border inspection system may compare the third data identifying a vehicle with the data from the data set of pre-registered border crossers, determine that an identifier for the vehicle is not included in the data set of pre-registered border crossers, and generate instructions to guide the vehicle to a particular lane, e.g., a secondary inspection lane.

FIG. 4 is a flow diagram of a process 400 for determining whether a vehicle and its passengers may use an automated border crossing process. For example, the process 400 can be used by the automated border inspection system 200.

The automated border inspection system receives, for each of three or more vehicles, first data identifying the vehicle and indicating entry of the vehicle into a border crossing station that provides access to the particular border (402). The first data may include image data for a corresponding vehicle. For instance, the automated border crossing inspection system may perform the process 400 or part of the process 400 and the process 500 for multiple vehicles to determine a category in which the vehicle and the passengers in the vehicle belong, e.g., whether the vehicle and the passengers in the vehicle can participate in an automated border crossing process, a semi-automated border crossing process, or neither.

The three or more vehicles may be consecutive vehicles that arrive at a border crossing station. In some examples, the three vehicles are not consecutive and other vehicles arrive at the border crossing station between at least some of the three vehicles. For instance, a first vehicle may arrive at the border crossing station and the automated border inspection system determines that the first vehicle should participate in a semi-automated border crossing process. The automated border inspection system may determine that five other vehicles which may participate in a semi-automated border inspection process arrive at the border crossing station before detecting a second vehicle that can participate in a manual border crossing process and then detecting a third vehicle, without an intervening vehicle between the second and third vehicles, that can participate in an automated border crossing process.

In some implementations, the process 400 may be for each of three vehicle classifications, e.g., vehicle and passengers pre-registered and recognized, vehicle and at least some passengers pre-registered and at least one passenger not recognized, and vehicle not pre-registered. In some implementations, a system may be configured with three vehicle classifications and include instructions, that when executed, cause the system to identify vehicles, and passengers, that belong to one of the classifications.

The automated border inspection system compares the first data identifying the vehicle with data from the data set of pre-registered border crossers to determine whether a set of data in the data set of pre-registered border crossers is for the same vehicle (404). For instance, the automated border inspection system determines whether the data set of pre-registered border crossers includes a record for the vehicle.

The automated border inspection system determines whether a) at least one passenger for the vehicle is not authorized to cross the particular border or is not allowed participation in an automated crossing process, or b) the vehicle is not authorized to cross the particular border or is not allowed participation in an automated crossing process, or c) the data set of pre-registered border crossers does not include any data for the vehicle (406). In response to determining that any of the above are true, the automated border inspection system provides instructions to guide the vehicle to a particular lane at the border crossing station at which a guard manually inspects the vehicle and current passengers in the vehicle (408). In some examples, the automated border inspection system provides instructions to guide the vehicle to a lane at a border crossing station that can be used for automated border crossings and generates instructions to direct a guard to inspect the vehicle when the vehicle is in the lane.

The automated border inspection system provides instructions for presentation of a user interface identifying the vehicle (410). For example, the automated border inspection system provides the instructions to a device operated by a guard. The instructions may instruct the guard to manually inspect the vehicle and, if known, provide information about the passengers in the vehicle.

In response to determining that the pre-registered passengers and the vehicle are authorized to cross the particular border using data from the data set of pre-registered border crossers, the automated border inspection system collects, for at least some of the current passengers in the vehicle, data representing the current passenger (412). For instance, the automated border inspection system sends instructions to one or more cameras that cause the cameras to capture images of the passengers. In some examples, image data for some of the passengers may not be captured, e.g., when a passenger is laying on a seat and out of a field of view of the camera or when the passenger is an infant in a child seat.

The order of steps in the process 400 described above is illustrative only, and the determination of whether the vehicle and its passengers may use the automated border crossing process can be performed in different orders. For example, the automated border inspection system may provide instructions for presentation of the user interface identifying the vehicle, e.g., step 410, before providing instructions to guide the vehicle to the particular lane, e.g., step 408.

In some implementations, the process 400 can include additional steps, fewer steps, or some of the steps can be divided into multiple steps. For example, step 412 may include one or more of the steps from the process 500 described in more detail below.

Figure 5:
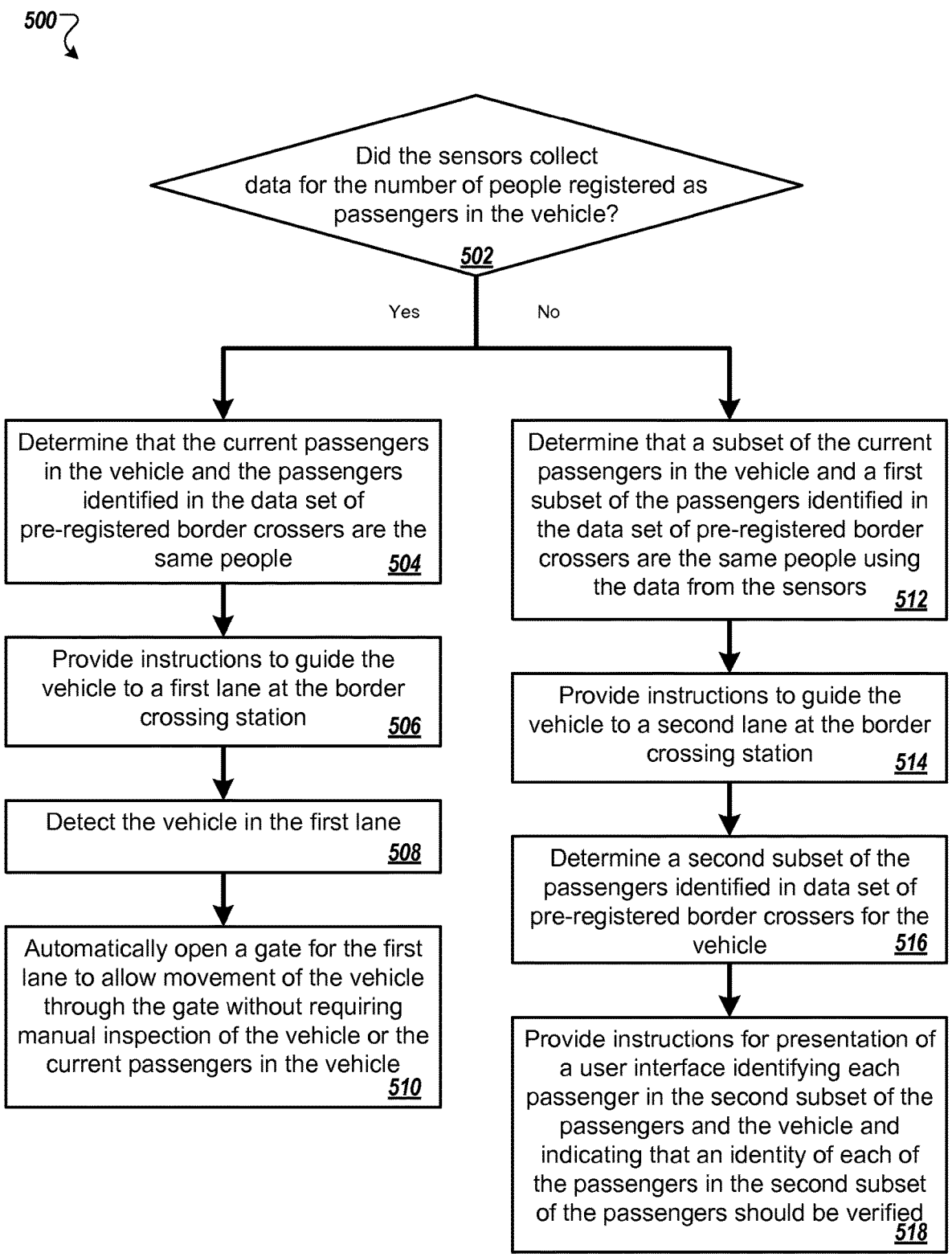
FIG. 5 is a flow diagram of a process for guiding a vehicle to a lane as part of an automated border crossing process.

FIG. 5 is a flow diagram of a process 500 for guiding a vehicle to a lane as part of an automated border crossing process. For example, the process 500 can be used by the automated border inspection system 200.

The automated border inspection system determines whether the sensors collected data for the number of people registered as passengers in the vehicle (502). For instance, the automated border inspection system determines whether the number of people pre-registered as passengers in a vehicle and the number of people shown in images captured of the vehicle is the same. In some examples, when the automated border inspection system determines that the sensors collected data for more than the number of people registered as passengers in the vehicle, and is unable to verify whether or not some of the current passengers are authorized to cross the particular border, the automated border inspection system may guide the vehicle to a manual inspection lane, e.g., perform steps 408 and 410.

In response to determining that the sensors collected data for the number of people registered as passengers in the vehicle, the automated border inspection system determines that the current passengers in the vehicle and the passengers identified in the data set of pre-registered border crossers are the same people (504). For instance, the automated border inspection system uses image data to determine that the current passengers in the vehicle and the pre-registered passengers are the same people and that the vehicle are authorized to cross the particular border.

The automated border inspection system provides instructions to guide the vehicle to a first lane at the border crossing station (506). The automated border inspection system may provide the instructions to a device operated by a passenger in the vehicle, e.g., a mobile device or the vehicle itself.

The automated border inspection system detects the vehicle in the first lane (508). For example, the automated border inspection system detects the vehicle in a primary inspection lane, e.g., the lane to which the automated border inspection system guides the vehicle.

In some examples, when the automated border inspection system detects the vehicle in a different lane than the lane or lanes to which the automated border inspection system directed the vehicle, the automated border inspection system may prompt a guard to inspect the vehicle. For instance, the automated border inspection system may prevent the vehicle from leaving the border crossing station, e.g., by not opening a gate to allow passage of the vehicle, and generate instructions for a guard to inspect the vehicle. In response to receipt of data from a device operated by the guard indicating that the passengers and the vehicle are authorized to cross the border, the automated border inspection system may allow the vehicle to cross the border, e.g., by causing a gate at the border control station to open.

The automated border inspection system automatically opens a gate for the first lane to allow movement of the vehicle through the gate without requiring manual inspection of the vehicle or the current passengers in the vehicle (510). For example, the automated border inspection system allows the vehicle to pass through the primary inspection lane. In some examples, the automated border inspection system may generate instructions for a guard indicating that the vehicle and its passengers are authorized to pass though the border crossing station without manual inspection.

In response to determining that the sensors collected data for fewer than the number of people registered as passengers in the vehicle, the automated border inspection system determines that a subset of the current passengers in the vehicle and a first subset of the passengers identified in the data set of pre-registered border crossers are the same people using the data from the sensors (512). For instance, the automated border inspection system is unable to capture image data for all of the current passengers in the vehicle or there are fewer current passengers in the vehicle than the expected number of passengers.

The automated border inspection system provides instructions to guide the vehicle to a second lane at the border crossing station (514). The second lane may be a primary inspection lane at which a guard will determine whether the vehicle and the passengers are authorized to cross the border. The second lane may be a secondary inspection lane.

The automated border inspection system determines a second subset of the passengers identified in data set of pre-registered border crossers for the vehicle (516). For example, the automated border inspection system determines for which of the pre-registered passengers the cameras were unable to capture image data, e.g., because the passengers are no longer in the vehicle or a camera was not able to capture image data for the passenger's face.

The automated border inspection system provides instructions for presentation of a user interface identifying each passenger in the second subset of the passengers and the vehicle and indicating that an identity of each of the passengers in the second subset of the passengers should be verified (518). The automated border inspection system provides the instructions to a device operated by a guard, e.g., a mobile device, a display, or another type of computer.

The guard determines whether the passengers and the vehicle are authorized to cross the border. A device operated by the guard receives data indicating the determination and provides the data, or other data representing the determination, to the automated border inspection system. In response to receipt of data indicating that the vehicle and its passengers are authorized to cross a border, the automated border inspection system may open a gate to allow the vehicle to cross the border.

The order of steps in the process 500 described above is illustrative only, and the guidance of the vehicle to the lane as part of the automated border crossing process can be performed in different orders. For example, the automated border inspection system may determine the second subset of the passengers and then provide instruction to guide the vehicle to the second lane.

In some implementations, the process 500 can include additional steps, fewer steps, or some of the steps can be divided into multiple steps. For example, when the automated border inspection system determines that there are fewer current passengers than a number of pre-registered passengers and that only pre-registered passengers are in a vehicle, the automated border inspection system may guide the vehicle to the first lane, e.g., a primary inspection lane.

In some implementations, when the automated border inspection system detects a passenger who is not pre-registered and is travelling in a vehicle that is pre-registered, the automated border inspection system may generate instructions to guide the vehicle to a semi-automated or a manual inspection lane, e.g., a secondary inspection lane.

In some implementations, the automated border inspection system does not include gates or gate controllers. In these implementations, the automated border inspection system generates instructions to cause presentation of information to a guard indicating whether or not a vehicle or some of the vehicle's passengers need to be manually authorized to cross a border.

The automated border inspection system may control access to any type of region. For instance, the border may be a border between two states or two countries. In some examples, the border may be a border for a particular building or a particular physical area that people need authorization to access.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 6:
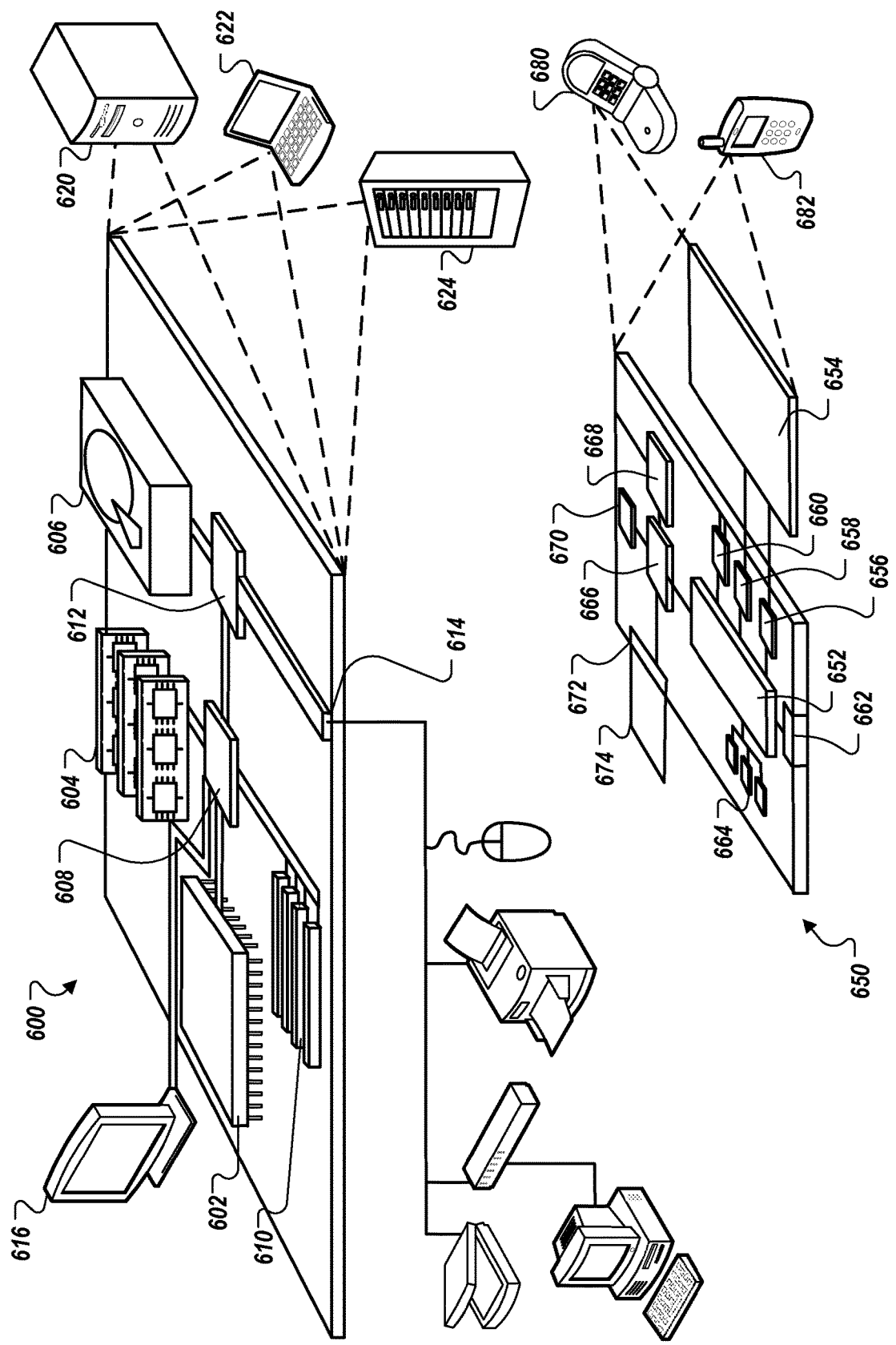
FIG. 6 is a block diagram of a computing system that can be used in connection with computer-implemented methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    in response to performing, by an automated border inspection system that includes (i) a kiosk that is located along a travel route toward a border crossing station and that is physically remote from the border crossing station, (ii) one or more authorization servers, (iii) one or more first sensors that are located at the border crossing station, (iv) one or more second sensors that are located at the border crossing station, (v) an instruction generation module that is configured to output one or more messages at one or more signs at the border crossing station, and (vi) a gate controller that is configured to selectively open and close one or more security barriers at the border crossing station, (a) a pre-vetting of a vehicle and one or more passengers for the vehicle while the vehicle and the one or more passengers are located at the kiosk that is located along the travel route toward the border crossing station and that is physically remote from the border crossing station, and (b) a validation of the pre-vetting when the vehicle and the one or more passengers ultimately arrive at the border crossing station, providing one or more particular messages on one or more of the signs by the instruction generation module, and selectively opening one or more of the security barriers by the gate controller,
    wherein performing the pre-vetting of the vehicle and the one or more passengers for the vehicle while the vehicle and the one or more passengers are located at the kiosk that is located along the travel route toward the border crossing station and that is physically remote from the border crossing station comprises:
        receiving, at the kiosk that is located along the travel route toward the border crossing station and that is physically remote from the border crossing station, first data identifying the vehicle and the one or more passengers for the vehicle that are requesting to cross a particular border, the first data being entered by one or more of the passengers through interaction with the kiosk;
        determining, by the one or more authorization servers of the automated border inspection system and using the first data identifying the passengers, whether each of the passengers for the vehicle is authorized to cross the particular border in response to receiving the first data; and
        in response to determining whether each of the passengers for the vehicle is authorized to cross the particular border, storing, by the one or more authorization servers of the automated border inspection system, second data in a data set of pre-registered border crossers that identifies the vehicle, each of the passengers, and whether each of the passengers is authorized to cross the particular border;
    wherein performing the validation of the pre-vetting when the vehicle and the one or more passengers ultimately arrive at the border crossing station comprises:
        receiving, from the one or more first sensors of the automated border inspection system, third data identifying the vehicle and indicating entry of the vehicle into the border crossing station that provides access to the particular border;
        in response to receiving the third data, comparing, by the one or more authorization servers of the automated border inspection system, the third data identifying the vehicle with data from the data set of pre-registered border crossers;
        determining an expiration period of time after which the second data in the data set of pre-registered border crossers is deleted, based on a distance between (a) the kiosk that is located along the travel route toward the border crossing station and that is physically remote from the border crossing station, where the first data was entered by the one or more passengers, and (b) the border crossing station;
        determining, by the one or more authorization servers of the automated border inspection system, that (i) the third data and the second data both identify the vehicle in response to comparing the third data identifying the vehicle with data from the data set of pre-registered border crossers, and (ii) the expiration period of time after which the second data in the data set of pre-registered border crossers is deleted, that was determined based on the distance between (a) the kiosk that is located along the travel route toward the border crossing station and that is physically remote from the border crossing station, where the first data was entered by the one or more passengers, and (b) the border crossing station, has not yet elapsed;

in response to determining, by the one or more authorization servers of the automated border inspection system, that (i) the third data and the second data both identify the vehicle in response to comparing the third data identifying the vehicle with data from the data set of pre-registered border crossers, and (ii) the expiration period of time after which the second data in the data set of pre-registered border crossers is deleted, that was determined based on the distance between (a) the kiosk that is located along the travel route toward the border crossing station and that is physically remote from the border crossing station, where the first data was entered by the one or more passengers, and (b) the border crossing station, has not yet elapsed, obtaining fourth data representing current passengers; and determining, by the one or more authorization servers of the automated border inspection system, whether the current passengers in the vehicle and the passengers identified in the second data are the same people by comparing the fourth data to the second data in the data set of pre-registered border crossers; and wherein providing one or more particular messages on one or more of the signs by the instruction generation module, and selectively opening one or more of the security barriers by the gate controller comprises:

providing, by the instruction generation module and on the one or more of the signs, the one or more particular messages that guide the vehicle to a first lane at the border crossing station;

detecting, by the one or more second sensors of the automated border inspection system, that the vehicle is in the first lane; and automatically opening, by the gate controller, a gate for the first lane to allow movement of the vehicle through the gate.

2. The method of claim 1, wherein each of the passengers for the vehicle is determined to be authorized to cross the particular border while the vehicle moves along the travel route toward the border crossing station.

3. The method of claim 1, wherein each of the passengers for the vehicle is determined to be authorized to cross the particular border before the vehicle arrives at the border crossing station.

4. The method of claim 1, wherein receiving the first data identifying the vehicle and the passengers for the vehicle that are requesting to cross the particular border comprises receiving a vehicle license plate number, and one or more of:

biometric information for at least some of the passengers;

passport information for at least some of the passengers; or visa information for at least some of the passengers.

5. The method of claim 4, wherein receiving the first data identifying the vehicle and the passengers for the vehicle that are requesting to cross the particular border comprises receiving an identifier for the particular border.

6. The method of claim 1, wherein:

receiving, from the one or more first sensors, the third data indicating the entry of the vehicle into the border crossing station that provides access to the particular border comprises:

receiving, from an image sensor at the border crossing station, data representing an image of a particular vehicle; and determining, using the data representing the image of the vehicle, an identifier for the particular vehicle;

comparing the third data identifying the vehicle with data from the data set of pre-registered border crossers comprises comparing the identifier for the particular vehicle with the second data identifying the vehicle to determine whether the particular vehicle and the vehicle are one in the same; and determining that the third data and the second data both identify the vehicle comprises determining that the vehicle has entered the border crossing station in response to determining that the particular vehicle and the vehicle are one in the same.

7. The method of claim 6, wherein determining the identifier for the particular vehicle comprises determining a license plate number for the particular vehicle.

8. A non-transitory computer readable storage medium storing instructions executable by a data processing apparatus and upon such execution cause the data processing apparatus to perform operations comprising:

in response to performing, by an automated border inspection system that includes (i) a kiosk that is located along a travel route toward a border crossing station and that is physically remote from the border crossing station, (ii) one or more authorization servers, (iii) one or more first sensors that are located at the border crossing station, (iv) one or more second sensors that are located at the border crossing station, (v) an instruction generation module that is configured to output one or more messages at one or more signs at the border crossing station, and (vi) a gate controller that is configured to selectively open and close one or more security barriers at the border crossing station, (a) a pre-vetting of a vehicle and one or more passengers for the vehicle while the vehicle and the one or more passengers are located at the kiosk that is located along the travel route toward the border crossing station and that is physically remote from the border crossing station, and (b) a validation of the pre-vetting when the vehicle and the one or more passengers ultimately arrive at the border crossing station, providing one or more particular messages on one or more of the signs by the instruction generation module, and selectively opening one or more of the security barriers by the gate controller, wherein performing the pre-vetting of the vehicle and the one or more passengers for the vehicle while the vehicle and the one or more passengers are located at the kiosk that is located along the travel route toward the border crossing station and that is physically remote from the border crossing station comprises:

receiving, at the kiosk that is located along the travel route toward the border crossing station and that is physically remote from the border crossing station, first data identifying the vehicle and the one or more passengers for the vehicle that are requesting to cross a particular border, the first data being entered by one or more of the passengers through interaction with the kiosk;

determining, by the one or more authorization servers of the automated border inspection system and using the first data identifying the passengers, whether each of the passengers for the vehicle is authorized to cross the particular border in response to receiving the first data; and in response to determining whether each of the passengers for the vehicle is authorized to cross the particular border, storing, by the one or more authorization servers of the automated border inspection system, second data in a data set of pre-registered border crossers that identifies the vehicle, each of the passengers, and whether each of the passengers is authorized to cross the particular border;

wherein performing the validation of the pre-vetting when the vehicle and the one or more passengers ultimately arrive at the border crossing station comprises:

receiving, from the one or more first sensors of the automated border inspection system, third data identifying the vehicle and indicating entry of the vehicle into the border crossing station that provides access to the particular border;

in response to receiving the third data, comparing, by the one or more authorization servers of the automated border inspection system, the third data identifying the vehicle with data from the data set of pre-registered border crossers;

determining an expiration period of time after which the second data in the data set of pre-registered border crossers is deleted, based on a distance between (a) the kiosk that is located along the travel route toward the border crossing station and that is physically remote from the border crossing station, where the first data was entered by the one or more passengers, and (b) the border crossing station;

determining, by the one or more authorization servers of the automated border inspection system, that (i) the third data and the second data both identify the vehicle in response to comparing the third data identifying the vehicle with data from the data set of pre-registered border crossers, and (ii) the expiration period of time after which the second data in the data set of pre-registered border crossers is deleted, that was determined based on the distance between (a) the kiosk that is located along the travel route toward the border crossing station and that is physically remote from the border crossing station, where the first data was entered by the one or more passengers, and (b) the border crossing station, has not yet elapsed;

in response to determining, by the one or more authorization servers of the automated border inspection system, that (i) the third data and the second data both identify the vehicle in response to comparing the third data identifying the vehicle with data from the data set of pre-registered border crossers, and (ii) the expiration period of time after which the second data in the data set of pre-registered border crossers is deleted, that was determined based on the distance between (a) the kiosk that is located along the travel route toward the border crossing station and that is physically remote from the border crossing station, where the first data was entered by the one or more passengers, and (b) the border crossing station, has not yet elapsed, obtaining fourth data representing current passengers; and determining, by the one or more authorization servers of the automated border inspection system, whether the current passengers in the vehicle and the passengers identified in the second data are the same people by comparing the fourth data to the second data in the data set of pre-registered border crossers; and wherein providing one or more particular messages on one or more of the signs by the instruction generation module, and selectively opening one or more of the security barriers by the gate controller comprises:

providing, by the instruction generation module and on the one or more of the signs, the one or more particular messages that guide the vehicle to a first lane at the border crossing station;

detecting, by the one or more second sensors of the automated border inspection system, that the vehicle is in the first lane; and automatically opening, by the gate controller, a gate for the first lane to allow movement of the vehicle through the gate.

9. The medium of claim 8, wherein each of the passengers for the vehicle is determined to be authorized to cross the particular border while the vehicle moves along the travel route toward the border crossing station.

10. The medium of claim 8, wherein each of the passengers for the vehicle is determined to be authorized to cross the particular border before the vehicle arrives at the border crossing station.

11. The medium of claim 8, wherein receiving the first data identifying the vehicle and the passengers for the vehicle that are requesting to cross the particular border comprises receiving a vehicle license plate number, and one or more of:

biometric information for at least some of the passengers;
passport information for at least some of the passengers; or
visa information for at least some of the passengers.

12. The medium of claim 11, wherein receiving the first data identifying the vehicle and the passengers for the vehicle that are requesting to cross the particular border comprises receiving an identifier for the particular border.

13. The medium of claim 8, wherein:

receiving, from the one or more first sensors, the third data indicating the entry of the vehicle into the border crossing station that provides access to the particular border comprises:

receiving, from an image sensor at the border crossing station, data representing an image of a particular vehicle; and determining, using the data representing the image of the vehicle, an identifier for the particular vehicle;

comparing the third data identifying the vehicle with data from the data set of pre-registered border crossers comprises comparing the identifier for the particular vehicle with the second data identifying the vehicle to determine whether the particular vehicle and the vehicle are one in the same; and determining that the third data and the second data both identify the vehicle comprises determining that the vehicle has entered the border crossing station in response to determining that the particular vehicle and the vehicle are one in the same.

14. The medium of claim 13, wherein determining the identifier for the particular vehicle comprises determining a license plate number for the particular vehicle.

15. An automated border inspection system that includes (i) a kiosk that is located along a travel route toward a border crossing station and that is physically remote from the border crossing station, (ii) one or more authorization servers, (iii) one or more first sensors that are located at the border crossing station, (iv) one or more second sensors that are located at the border crossing station, (v) an instruction generation module that is configured to output one or more messages at one or more signs at the border crossing station, and (vi) a gate controller that is configured to selectively open and close one or more security barriers at the border crossing station, the automated border inspection system comprising:

one or more processing devices; and
 one or more storage devices storing instructions that are executable by the one or more processing devices to perform operations comprising:
  in response to performing (a) a pre-vetting of a vehicle and one or more passengers for the vehicle while the vehicle and the one or more passengers are located at the kiosk that is located along the travel route toward the border crossing station and that is physically remote from the border crossing station, and (b) a validation of the pre-vetting when the vehicle and the one or more passengers ultimately arrive at the border crossing station, providing one or more particular messages on one or more of the signs by the instruction generation module, and selectively opening one or more of the security barriers by the gate controller,
  wherein performing the pre-vetting of the vehicle and the one or more passengers for the vehicle while the vehicle and the one or more passengers are located at the kiosk that is located along the travel route toward the border crossing station and that is physically remote from the border crossing station comprises:
   receiving, at the kiosk that is located along the travel route toward the border crossing station and that is physically remote from the border crossing station, first data identifying the vehicle and the one or more passengers for the vehicle that are requesting to cross a particular border, the first data being entered by one or more of the passengers through interaction with the kiosk;
   determining, by the one or more authorization servers of the automated border inspection system and using the first data identifying the passengers, whether each of the passengers for the vehicle is authorized to cross the particular border in response to receiving the first data; and
   in response to determining whether each of the passengers for the vehicle is authorized to cross the particular border, storing, by the one or more authorization servers of the automated border inspection system, second data in a data set of pre-registered border crossers that identifies the vehicle, each of the passengers, and whether each of the passengers is authorized to cross the particular border;
  wherein performing the validation of the pre-vetting when the vehicle and the one or more passengers ultimately arrive at the border crossing station comprises:
   receiving, from the one or more first sensors of the automated border inspection system, third data identifying the vehicle and indicating entry of the vehicle into the border crossing station that provides access to the particular border;
   in response to receiving the third data, comparing, by the one or more authorization servers of the automated border inspection system, the third data identifying the vehicle with data from the data set of pre-registered border crossers;
   determining an expiration period of time after which the second data in the data set of pre-registered border crossers is deleted, based on a distance between (a) the kiosk that is located along the travel route toward the border crossing station and that is physically remote from the border crossing station, where the first data was entered by the one or more passengers, and (b) the border crossing station;
   determining, by the one or more authorization servers of the automated border inspection system, that (i) the third data and the second data both identify the vehicle in response to comparing the third data identifying the vehicle with data from the data set of pre-registered border crossers, and (ii) the expiration period of time after which the second data in the data set of pre-registered border crossers is deleted, that was determined based on the distance between (a) the kiosk that is located along the travel route toward the border crossing station and that is physically remote from the border crossing station, where the first data was entered by the one or more passengers, and (b) the border crossing station, has not yet elapsed;
   in response to determining, by the one or more authorization servers of the automated border inspection system, that (i) the third data and the second data both identify the vehicle in response to comparing the third data identifying the vehicle with data from the data set of pre-registered border crossers, and (ii) the expiration period of time after which the second data in the data set of pre-registered border crossers is deleted, that was determined based on the distance between (a) the kiosk that is located along the travel route toward the border crossing station and that is physically remote from the border crossing station, where the first data was entered by the one or more passengers, and (b) the border crossing station, has not yet elapsed, obtaining fourth data representing current passengers; and
   determining, by the one or more authorization servers of the automated border inspection system, whether the current passengers in the vehicle and the passengers identified in the second data are the same people by comparing the fourth data to the second data in the data set of pre-registered border crossers; and
  wherein providing one or more particular messages on one or more of the signs by the instruction generation module, and selectively opening one or more of the security barriers by the gate controller comprises:
   providing, by the instruction generation module and on the one or more of the signs, the one or more particular messages that guide the vehicle to a first lane at the border crossing station;
   detecting, by the one or more second sensors of the automated border inspection system, that the vehicle is in the first lane; and
   automatically opening, by the gate controller, a gate for the first lane to allow movement of the vehicle through the gate.

16. The system of claim 15, wherein each of the passengers for the vehicle is determined to be authorized to cross the particular border while the vehicle moves along the travel route toward the border crossing station.

17. The system of claim 15, wherein each of the passengers for the vehicle is determined to be authorized to cross the particular border before the vehicle arrives at the border crossing station.

18. The system of claim 15, wherein receiving the first data identifying the vehicle and the passengers for the vehicle that are requesting to cross the particular border comprises receiving a vehicle license plate number, and one or more of:
- biometric information for at least some of the passengers;
- passport information for at least some of the passengers; or
- visa information for at least some of the passengers.

19. The system of claim 18, wherein receiving the first data identifying the vehicle and the passengers for the vehicle that are requesting to cross the particular border comprises receiving an identifier for the particular border.

20. The system of claim 15, wherein:
receiving, from the one or more first sensors, the third data indicating the entry of the vehicle into the border crossing station that provides access to the particular border comprises:
  receiving, from an image sensor at the border crossing station, data representing an image of a particular vehicle; and
  determining, using the data representing the image of the vehicle, an identifier for the particular vehicle;
comparing the third data identifying the vehicle with data from the data set of pre-registered border crossers comprises comparing the identifier for the particular vehicle with the second data identifying the vehicle to determine whether the particular vehicle and the vehicle are one in the same; and
determining that the third data and the second data both identify the vehicle comprises determining that the vehicle has entered the border crossing station in response to determining that the particular vehicle and the vehicle are one in the same.

* * * * *